United States Patent
Li et al.

(10) Patent No.: US 11,142,117 B2
(45) Date of Patent: Oct. 12, 2021

(54) REGULATING ASSEMBLY FOR LIGHT SOURCE, AND LIGHTING AND/OR SIGNALING DEVICE, ADJUSTING DEVICE, LIGHTING DEVICE AND MOTOR VEHICLE, BEZEL DEVICE, GAS GUIDING DEVICE, AND LIGHTING AND/OR SIGNALING DEVICE CONTAINING THE SAME

(71) Applicant: FOSHAN ICHIKOH VALEO AUTO LIGHTING SYSTEMS CO., LTD., Foshan (CN)

(72) Inventors: Daihua Li, Foshan (CN); Sishui Hu, Foshan (CN); Jinjin Pei, Foshan (CN)

(73) Assignee: FOSHAN ICHIKOH VALEO AUTO LIGHTING SYSTEMS CO., LTD., Foshan (CN)

( * ) Notice: Subject to any disclaimer, the term of this patent is extended or adjusted under 35 U.S.C. 154(b) by 0 days.

(21) Appl. No.: 17/107,335

(22) Filed: Nov. 30, 2020

(65) Prior Publication Data

US 2021/0078482 A1 Mar. 18, 2021

Related U.S. Application Data

(62) Division of application No. 16/472,650, filed as application No. PCT/CN2017/115924 on Dec. 13, 2017, now Pat. No. 10,960,808.

(30) Foreign Application Priority Data

Dec. 16, 2016 (CN) .......................... 201621386283.9
Dec. 22, 2016 (CN) .......................... 201611204281.8
(Continued)

(51) Int. Cl.
*F21S 45/20* (2018.01)
*B60Q 1/068* (2006.01)
(Continued)

(52) U.S. Cl.
CPC ......... *B60Q 1/0683* (2013.01); *B60Q 1/0088* (2013.01); *B60Q 1/0483* (2013.01);
(Continued)

(58) Field of Classification Search
CPC ....................................................... F21S 43/50
(Continued)

(56) References Cited

U.S. PATENT DOCUMENTS 3,823,314 A ‡ 7/1974 Germany ............. B60Q 1/0683
362/419
4,707,769 A ‡ 11/1987 Van Duyn ............ B60Q 1/0683
362/372
(Continued)

FOREIGN PATENT DOCUMENTS

CN 1362594 A ‡ 8/2002
CN 101634419 A 1/2010
(Continued)

OTHER PUBLICATIONS

International Search Report dated Mar. 22, 2018 in PCT/CN2017/115924 filed on Dec. 13, 2017.
(Continued)

*Primary Examiner* — Christopher M Raabe
(74) *Attorney, Agent, or Firm* — Oblon, McClelland, Maier & Neustadt, L.L.P

(57) ABSTRACT

A regulating assembly for a light source and a lighting and/or signaling device, an adjusting device, a lighting device and a motor vehicle, a bezel device, and a gas guiding device and a lighting and/or signaling device containing the same are provided in the present disclosure. The regulating assembly and the adjusting device are used to adjust the lighting and/or signaling module in the lighting device provided in the housing of the lighting device. The bezel device and the gas guiding device may be used for the
(Continued)

lighting and/or signaling device. The regulating assembly comprises a supporting frame coupled in a displaceable manner to the light source, a fixed regulating portion which is rotatable, and horizontal and vertical regulating portions in a form of a ball-headed screw-thread part. The adjusting device includes an adjusting screw, a slider and a base, and the bezel device includes a top bezel having a flat plate-like body and a main bezel including a first bezel and a second bezel. The gas guiding device comprises a gas channel and a flow guiding component for guiding an air flow through one or more readily condensable locations of the lighting and/or signaling device.

8 Claims, 17 Drawing Sheets

(30) Foreign Application Priority Data

Dec. 22, 2016 (CN) .......................... 201621423283.1
Dec. 28, 2016 (CN) .......................... 201621453938.X
Dec. 28, 2016 (CN) .......................... 201621462646.2

(51) Int. Cl.
  *F21S 43/50* (2018.01)
  *B60Q 1/00* (2006.01)
  *B60Q 1/04* (2006.01)
  *B60Q 1/14* (2006.01)

(52) U.S. Cl.
  CPC ............ *B60Q 1/1423* (2013.01); *F21S 43/50* (2018.01); *B60Q 2200/32* (2013.01)

(58) Field of Classification Search
  USPC ........................................................ 362/507
  See application file for complete search history.

(56) References Cited

U.S. PATENT DOCUMENTS

| | | | | |
|---|---|---|---|---|
| 4,998,184 A ‡ | 3/1991 | Honig | ................. | B60Q 1/0683 362/28 |
| 5,003,436 A ‡ | 3/1991 | Yamada | ............... | B60Q 1/0683 362/420 |
| 5,172,973 A * | 12/1992 | Spada | ..................... | F21V 29/02 362/218 |
| 6,637,919 B2 ‡ | 10/2003 | Shirai | .................. | B60Q 1/0683 362/51 |
| 7,329,033 B2 * | 2/2008 | Glovatsky | ............... | F21V 29/74 362/547 |
| 8,985,824 B2 ‡ | 3/2015 | Ito | ........................... | F21S 45/60 362/54 |
| 2009/0303742 A1* | 12/2009 | Yasuda | ................... | F21S 45/49 362/547 |
| 2011/0051453 A1* | 3/2011 | Nagasawa | ............. | F21S 45/435 362/547 |
| 2011/0242833 A1* | 10/2011 | Tominaga | ............. | F21S 41/148 362/539 |

FOREIGN PATENT DOCUMENTS

| | | | |
|---|---|---|---|
| CN | 101634419 A | ‡ | 1/2010 |
| CN | 202691987 U | ‡ | 1/2013 |
| CN | 202691987 U | | 1/2013 |
| CN | 203318271 U | ‡ | 12/2013 |
| CN | 203318271 U | | 12/2013 |
| CN | 206257585 U | ‡ | 6/2017 |
| CN | 206280877 U | ‡ | 6/2017 |
| CN | 206459128 U | ‡ | 9/2017 |
| CN | 206459159 U | ‡ | 9/2017 |
| EP | 0 393 366 A1 | | 10/1990 |
| EP | 0393366 A1 | ‡ | 10/1990 |

OTHER PUBLICATIONS

Written Opinion of the International Searching Authority dated Mar. 22, 2018 in PCT/CN2017/115924 filed on Dec. 13, 2017.

\* cited by examiner
‡ imported from a related application

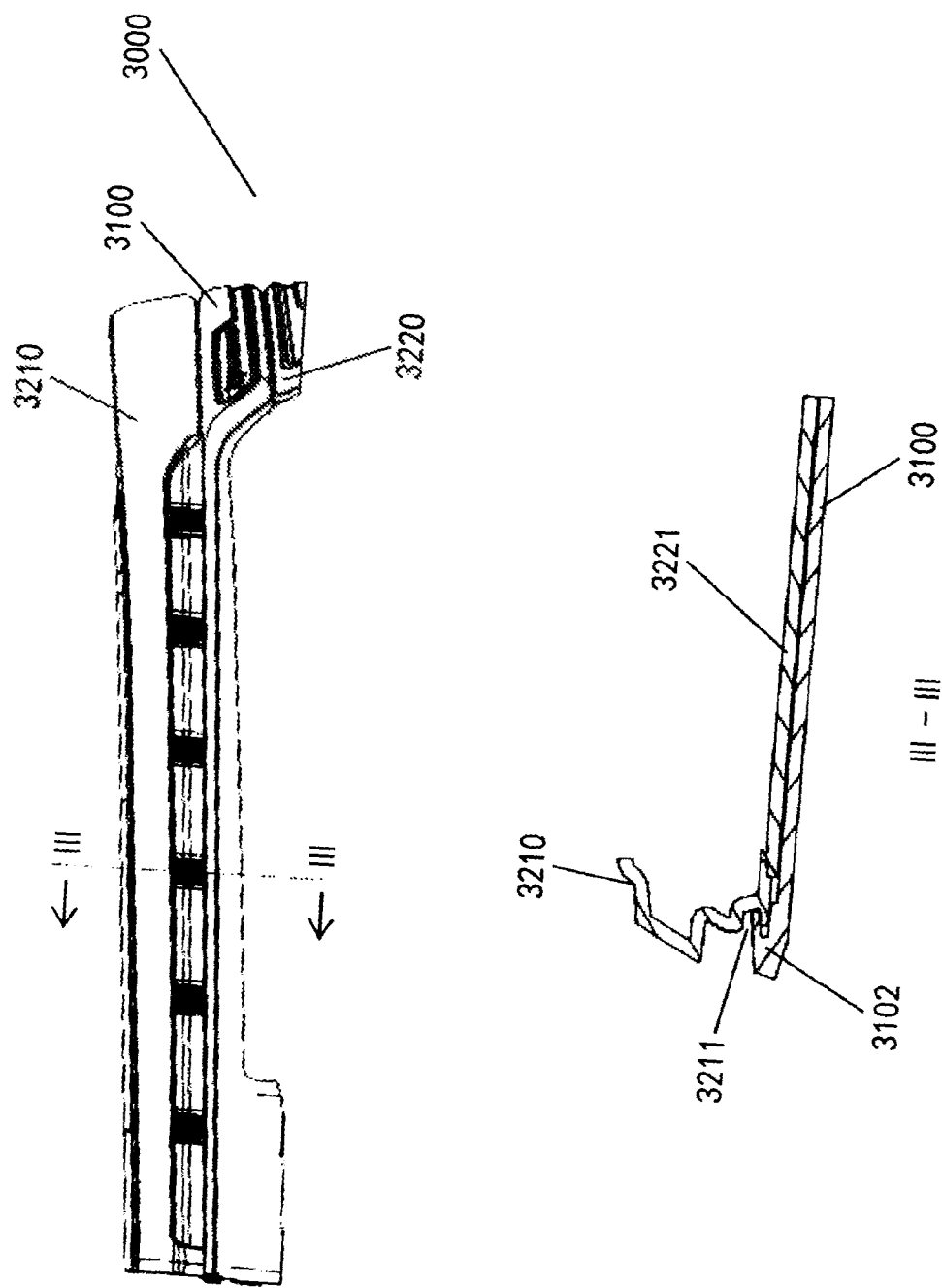

REGULATING ASSEMBLY FOR LIGHT SOURCE, AND LIGHTING AND/OR SIGNALING DEVICE, ADJUSTING DEVICE, LIGHTING DEVICE AND MOTOR VEHICLE, BEZEL DEVICE, GAS GUIDING DEVICE, AND LIGHTING AND/OR SIGNALING DEVICE CONTAINING THE SAME

CROSS-REFERENCE TO RELATED APPLICATION

This application is a divisional of U.S. application Ser. No. 16/472,650, filed Jun. 21, 2010, which is a 371 of International Application No. PCT/CN2017/115924, filed Dec. 13, 2017, which claims priority to Chinese Application No. 201621462646.2, filed Dec. 28, 2016, Chinese Application No. 201621453938.X, filed Dec. 28, 2016, Chinese Application No. 201621423283.1, filed Dec. 22, 2016, Chinese Application No. 201611204281.8, filed Dec. 22, 2016 and Chinese Application No. 201621386283.9, filed Dec. 16, 2016; the entire contents of which are incorporated herein by reference.

BACKGROUND OF THE DISCLOSURE

Field of the Disclosure

The present disclosure relates to the technical field of luminous lighting and signaling, and in particular, to a regulating assembly for a light source of a lighting and/or signaling device, and a lighting and/or signaling device containing the same.

The present disclosure further relates to an adjusting device, a lighting device and a motor vehicle.

The present disclosure further relates to a bezel device, a lighting device and a motor vehicle.

The present disclosure further relates to the technical field of luminous lighting and signaling, and in particular, to a gas guiding device, and a lighting and/or signaling device containing the gas guiding device.

DESCRIPTION OF THE RELATED ART

As to a lighting and/or signaling device, especially a vehicle lamp of the motor vehicle, the performance thereof is crucial to driving safety of the vehicle. In practice, a vehicle lamp of the motor vehicle typically comprises a LB (Low Beam) module corresponding to a LB irradiation mode and a HB (High Beam) module corresponding to a HB irradiation mode, respectively, the LB module functioning as a common basic lighting module for the two irradiation modes while the HB module functioning as an extension lighting module only for the HB irradiation mode. In other words, when the vehicle lamp operates in the LB irradiation mode, only the LB module is turned on to emit light so as to generate a LB light profile; whereas when the vehicle lamp operates in the HB irradiation mode, both the LB module and the HB module are turned on simultaneously to emit light collectively so as to generate a HB light profile. Therefore, it is typically required to adjust the HB module which functions as the extension lighting module so as to implement an accurate optical combination between the LB module and the HB module, to implement the desired HB light profile.

In practice, since some process deviations, and stack-up or accumulative tolerances caused by these process deviations collectively, may be created inevitably during manufacturing and assembling processes of products, resulting in a unavoidable problem of a deviation between the final HB light profile and the desired HB light profile. Therefore it is required that the HB module should be adjusted horizontally and vertically to implement an accurate positioning of the HB module so as to diminish or even eliminate said process deviations and said stack-up or accumulative tolerances.

However, upon consideration of both horizontal and vertical adjustments on the HB module, since it is difficult to ensure that when one of the horizontal and vertical adjustments is implemented individually, the other one of the horizontal and vertical adjustments is prevented from being influenced correlatively due to a common coupling relationship of the component(s) acted on hereby, it may result in a problem to be solved urgently concerning validity of the adjustments m different directions which may hardly overcome the said process deviations and said stack-up or accumulative tolerances.

Hereby, in the prior art, it is imperative to implement horizontal and vertical adjustments onto the HB module individually and independently from each other by an improved regulating device in a lighting and/or signaling system, avoiding mutual interference therebetween while overcoming influence caused by the process deviations and the stack-up or accumulative tolerances during manufacturing and assembling processes effectively, such that there is essentially consistency rather than any deviation between the final HB light profile and the desired HB light profile. Moreover, such an improved regulating device may not increase structural complexity of the lighting and/or signaling system, for facilitating fabrication thereof.

In existing lighting device for a motor vehicle, the spatial position of the lighting module in the lighting device usually needs to be adjusted so that the lighting module achieves the desired optical function. The lighting module is connected with the housing of the lighting device through a ball-and-socket structure. Generally, three ball sockets are provided on the lighting module, and three ball heads are provided on three cylindrical rods respectively. The first cylindrical rod is fixedly connected to the housing of the lighting device, and the second and third cylindrical rods are screwed into the threaded holes of the housing of the lighting device. The first cylindrical rod is aligned with the second cylindrical rod in the vertical direction to adjust the pitch angle of the lighting module in a vertical plane. The third cylindrical rod is aligned with the second cylindrical rod in a horizontal direction so as to adjust the orientation of the lighting module in a horizontal plane. In the existing design, the first cylindrical rod and the second cylindrical rod are located close to the housing of the lighting device and the third cylindrical rod is far from the housing of the lighting device due to the structure of the vehicle body. That is, the third cylindrical rod is a long screw screwed into a threaded hole in the housing of the lighting device. The front end of the long screw is provided with a ball head for connection with the ball socket provided on the lighting module. Rotating the long screw can drive the lighting module to move to change its relative spatial position in the lighting device to achieve the adjustment of the lighting module.

However, the adjusting screw between the existing lighting module and the housing, which is the third cylindrical rod, is too long, and a long force arm is formed between the lighting module and the housing of the lighting device. When the vehicle vibrates in the up-down direction, the adjusting screw is easily broken or a portion of the housing of the lighting device connected with the adjusting screw is easily damaged. Therefore, there is a need for an adjusting device that can reliably adjust the spatial position of the lighting module.

The bezel device of the lighting device of the existing motor vehicle adopts an integrally molded structure. For the reason of appearance, the bezel device consists of a transparent upper bezel and an opaque lower bezel. The transparent upper bezel and the opaque lower bezel are integrally formed by overmolding. A groove extending in the front-rear direction of the vehicle is provided at bottom of the front surface of the transparent upper bezel. The bottom of the groove needs to be coated with an aluminum layer. The portion of the lower bezel adjacent to the upper bezel needs to be coated with an aluminum layer in the left-right direction of the vehicle to improve the appearance of the lighting device.

However, the above existing designs have some disadvantages. The groove on the front surface of the upper bezel reaches a depth of 9 mm in the front-rear direction of the vehicle. When an aluminum plating process is carried out on the bottom surface of the groove, any plating layers can not generally be formed on the rear portion of the bottom surface of the groove, to avoid affecting the appearance of the vehicle. In addition, when the portion of the front surface of the lower bezel adjacent to the upper bezel is aluminized, it is necessary to shield the portion of the bezel device that does not require aluminum plating. However, due to process limitations, the boundary between the aluminized and non-aluminized portions of the bezel device is not clear, affecting the appearance of the vehicle.

Therefore, there is a need for a bezel device for a lighting device so that the bottom of the groove in the bezel device can be formed with a uniform plating layer and so that the boundary of the aluminum-coated portion in the front surface of the lower bezel is clear, improving the appearance of the lighting device and meeting design requirements.

For the lighting and/or signaling device, especially a vehicle lamp of a motor vehicle, the performance thereof is crucial to driving safety of the vehicles. In practice, it is inevitable that the vehicle lamp which functions as a light source may emit heat. As to the heat emitted during operation of the light source, on one hand, an accumulation of the heat inside the vehicle lamp may readily bring about adverse effects on service life of the entire vehicle lamp, resulting in a problem of heat dissipation which is required to be solved urgently, on the other hand, the heat may result in an elevated temperature locally inside the vehicle lamp, and thus produce temperature differences among different regions inside the vehicle lamp. Therefore, when the air humidity rises above a certain level, a phenomenon of condensation may occur in the vehicle lamp. In addition, in consideration of design of style, there may be some dead corners where heal transfer may become relatively slow, which may exacerbate imbalance of temperature distribution in the vehicle lamp. The problem of condensation in the vehicle lamp may be taken into serious consideration since it may weaken illumination and/or signaling effects.

As to a problem of heat dissipation of the vehicle lamp os set forth in the first aspect, in the prior art, heat may be absorbed by providing a heat sink at a position where the vehicle lamp is mounted so as to maintain the temperature inside the vehicle lamp at a relative low level, without being influence by excessively high temperature during normal operation. As to a problem of condensation of moisture at the vehicle lamp as set forth in the second aspect, in the prior art, the problem of condensation may be overcome or prevented by providing an anti-fog coating at an appropriate location within the vehicle lamp.

However, upon handling of the problems of heat dissipation or preventing condensation by above conventional technical means, there still exist some defects. Above all, the dimension of the heat sink may be relatively large due to design, resulting in a waste of space, such that any mechanism for preventing condensation may not be readily provided additionally in a restricted space. Then, however, there is still a problem of aging or degradation of the anti-fog coating, i.e., it may fail after a period of time; and the anti-fog coating is provided inside the vehicle lamp, frequently resulting in difficulties in repairing/restoring the anti-fog coating, such that sometime even an entire replacement of the vehicle lamp may be required to solve such a problem, causing an increase in maintenance cost. Next, when handling the problem of heat dissipation, typically, a cooling way of ventilation to the external environment and blowing air towards the light source may be used so as to facilitate heat dissipation of the heat sink. In fact, in operation, the vehicle lamp is heated and thus the gas contained therein may be compressed in a condition without any ventilation thereof. Therefore, ventilation may enable the gas to expand, i.e., facilitating a pressure equilibrium between inside and outside of the vehicle lamp; however, the existence of ventilation further introduce a problem in that, external moisture may in turn be introduced in the vehicle lamp, which may easily facilitate occurrence of condensation therein. Specifically, the vehicle lamp especially such as a halogen lamp or a xenon lamp and the like, may emit a large amount of heat; white a so-called cold light source (e.g., LED light source) has semiconductor elements which may emit heat much less than heat of the halogen light source or the xenon light source. Based on above heat difference and shape of transparent covering element of the vehicle lamp (e.g., a glass component) which has a cold region, then, the larger the area of the cold region is the less the heating applied onto the transparent covering element may be. In a region of the glass component of the vehicle lamp having a relatively low temperature, a condensation may occur readily at an enclosed glass component. In a condition that the light source has semiconductor elements, such a risk of condensation is even higher, since even though the semiconductor elements are heated, the glass component may not be heated accordingly due to transparency thereof as compared with other light sources. In order to eliminate condensation, it is necessary to introduce moisture into the lighting and/or signaling device upon ventilation, and also a evaporation of the moisture may be promoted.

To this end, in the prior art, it is urgently required to solve problems of heat dissipation and avoidance of condensation simultaneously in the lighting and/or signaling system, without increasing complexity of its structure so as to facilitate manufacturing.

SUMMARY OF THE DISCLOSURE

Die embodiments of the present disclosure have been made to overcome or alleviate at least one aspect of the above mentioned disadvantages and/or shortcomings in the prior art, by providing a regulating assembly for a light source of a lighting and/or signaling device, which is simple in construction thereof and occupies relatively small space, and may also implement both horizontal and vertical adjustments on the HB module individually and independently from each other, so as to realize a purpose of overcoming influences of the process deviations and the stack-up or accumulative tolerances.

The embodiments of the present disclosure have also been made to provide a lighting and/or signaling device comprising the regulating assembly, which device may not only facilitate elimination of influences of both the process deviations and the stack-up or accumulative tolerances on the HB module of the lighting and/or signaling device, but also be capable of implementing a technical effect of obtaining desired HB light profiles of the lighting and/or signaling device without any substantive change to the structure thereof.

Following technical solutions are adopted in exemplary embodiments of the disclosure for achieving the above desired purposes.

According to an aspect of the present disclosure, it provides a supporting frame, which is coupled in a displaceable manner to the light source, a rotatable fixed regulating portion, which is fixed rotatably at an anchor point on the light source, and is configured to have one rotation degree of freedom at the anchor point; and a horizontal regulating portion and a vertical regulating portion, each of which is in a form of a ball-headed screw-thread part and comprises: a rod-shaped body, which is restricted to be movable forwards or backwards only in a corresponding one of a horizontal direction and a vertical direction; and a ball bead, which is formed on the rod-shaped body and accommodated within a spherical recess on the supporting frame, the spherical recess being opened partially towards the ball head in the corresponding one of the horizontal direction and the vertical direction, wherein the ball head is configured to be movable forwards or backwards driven by the rod-shaped body, only in the corresponding one of the horizontal direction and the vertical direction, and is further configured to be propped turnably against an inner wall of the spherical recess in a direction deviated from a direction in which the rod-shaped body moves.

According to a further embodiment of the present disclosure, the supporting frame is configured to be displaceable by an adjustment of an additional screw-thread part disposed adjacent thereto so as to counteract a displacement of the supporting frame due to turning of at least one of the horizontal regulating portion and the vertical regulating portion within corresponding spherical recess or recesses.

According to a further embodiment of the present disclosure, the rod-shaped boy of each of the horizontal regulating portion and the vertical regulating portion extends throughout a predetermined channel which is formed in a fixture support fixed onto the light source, in the corresponding one of the horizontal direction and the vertical direction.

According to a further embodiment of the present disclosure, around the spherical recess, a protruding portion which expands outwards is provided for guiding the ball head from outside of the spherical recess into the spherical recess.

According to a further embodiment of the present disclosure, the fixed regulating portion is constructed to be in a form of a ball-head shape, and configured to cooperate with a ball-head retaining member provided adjacent thereto on the supporting frame such that the fixed regulating portion is configured to be only rotatable in situ.

According to another aspect of the present disclosure, it provides a lighting and/or signaling device, comprising a light source and the regulating assembly as described above. The regulating assembly is mounted on the light source and configured to regulate the light source.

By at least one aspect of aforementioned technical solutions of the disclosure, for the lighting and/or signaling device, technical effects of saving space and avoiding any influence on the process deviations and the stack-up or accumulative tolerances may be realized so as to obtain a desired HB light profile, with a relative low cost and a relatively simple and compact structure.

The present disclosure also provides an adjusting device for adjusting a lighting module in a lighting device, the lighting module being provided in a housing of a lighting device, the adjusting device including:

an adjusting screw which is turned into a threaded hole in the housing;

a slider provided in the housing, a first end of the adjusting screw being connected to the slider, a guide rail being provided on a bottom surface of the slider, and the guide rail extending in a first direction;

a base in which a guide groove is provided, wherein the guide groove is engaged with the guide rail so that the guide rail is slidable freely in the guide groove in the first direction.

According to an embodiment of the present disclosure, a ball head is provided at the first end of the adjusting screw, wherein a ball socket is provided on a first side of the slider adjacent to the first end of the adjusting screw, and wherein the ball head on the adjusting screw is engaged with the ball socket on the slider so that the slider is movable in the guide groove in the first direction, driven by the adjusting screw.

According to an embodiment of the present disclosure, a ball head is provided on a second side of the slider that is opposite to the first side, wherein a ball socket is arranged on the lighting module, and wherein the ball head on the slider is engaged with the ball socket on the lighting module such that the lighting module is movable within a space in the lighting device, driven by the slider.

According to an embodiment of the present disclosure, the guide rail has a shape complementary to the shape of the guide groove.

According to an embodiment of the present disclosure, the guide rail is an inverted T-shaped portion, and the guide groove is an inverted T-shaped groove.

According to an embodiment of the present disclosure, the base is integrally formed on an inner surface of the housing, the guide groove is formed by a first wall and a second wall that protrude from the inner surface of the housing and are symmetrical with respect to a central plane of the guide groove, each of the first wall and the second wall including:

a first section extending vertically from the inner surface of the housing and perpendicular to the inner surface of the housing;

a second section extending parallel to the inner surface of the housing toward the central plane from an end of the first section that is away from the inner surface of the housing; and a third section extending from an end of the second section that is close to the central plane in a direction parallel to the first section and away from the inner surface of the housing.

According to an embodiment of the present disclosure, a vertical section of the inverted T-shaped portion of the slider includes at least one recessed portion which is formed on a lower surface of the inverted T-shaped portion.

According to an embodiment of the present disclosure, the guide groove is a dovetail groove, and the guide rail has a shape complementary to the shape of the guide groove.

According to an embodiment of the present disclosure, the first direction is a horizontal direction.

According to another aspect of the present disclosure, it provides a lighting device including the above adjusting device.

According to a further aspect of the present disclosure, it provides a motor vehicle including the above lighting device.

With the adjusting device of the lighting module and the lighting device according to the present disclosure, the length of the third adjusting screw which results in a suspended state of the lighting module in the lighting device is shortened, and the length of the force arm generated by the lighting module relative to the housing of the lighting device is reduced. The possibility of damage to the screw and the housing can be effectively reduced when they are subject to vibration in the vertical direction and the reliability of the lighting device is improved.

The present disclosure further provides a bezel device including:
- a top bezel having a flat plate-like body, and
- a main bezel including a first bezel and a second bezel, a main hole being formed in the second bezel, the second bezel having a top plate that extends in a first direction above the main hole, the first bezel being connected to the second bezel at a front edge of the top plate and extending upwards in front of the front edge,
- wherein the top bezel is fixedly connected to the first bezel and the second bezel by a clipping device such that an upper surface of the flat plate-like body of the top bezel is in contact with a lower surface of the top plate of the second bezel.

According to an embodiment of the present disclosure, the clipping device includes a first stop device, the first stop device including:
- at least one groove that is provided on a side surface of the first bezel and extends in the first direction; and
- at least one barb provided at a position of the top bezel corresponding to the groove and covering an entire lower surface of the groove,
- wherein the barb is engaged with the groove such that the top bezel is prevented from moving in the first direction relative to the main bezel.

According to an embodiment of the present disclosure, an aluminum layer is coated on an outer surface of the barb.

According to an embodiment of the present disclosure, the clipping device further includes a second stop device, the second stop device including:
- an arc-shaped protrusion provided on the upper surface of the flat plate-like body of the top bezel, the arc-shaped protrusion having an apex and two ends that face toward a third direction opposite to the first direction, an end surface of each of the two ends being parallel to a second direction and being perpendicular to the upper surface of the flat plate-like body of the top bezel, the second direction being perpendicular to the first direction; and
- two resilient arms provided in the top plate of the second bezel, the two resilient arms being connected in parallel in the first direction in a first hole penetrating through the top plate in a thickness direction of the top plate, each resilient arm being provided with a lateral protrusion extending towards the other resilient arm, the lateral protrusion having a rear surface that extends in a direction parallel to the second direction and perpendicular to the upper surface of the top plate and an inclined surface that is inclined at an angle to the first direction and extends in the direction perpendicular to the upper surface of the top plate,
- wherein the end surface of each arc-shaped protrusion is engaged with the rear surface of the respective lateral protrusion such that the top bezel is prevented from moving in the third direction relative to the main bezel.

According to an embodiment of the present disclosure, the clipping device further includes a third stop device, the third stop device including:
- a second hole formed in the top plate of the second bezel, the second hole penetrating through the top plate in a thickness direction of the top plate; and
- a plate-like inclined portion extending substantially in the first direction towards the top plate from the upper surface of the flat plate-like body of the top bezel,
- wherein when the top bezel is assembled to the main bezel, the plate-like inclined portion passes through the second hole and is engaged with an edge of the second hole such that the top bezel is prevented from moving in a third direction opposite to the first direction relative to the main bezel.

According to an embodiment of the present disclosure, the clipping device further includes a fourth stop device, the fourth stop device including:
- a rib provided on the upper surface of the flat plate-like body of the top bezel and extending in a second direction perpendicular to the first direction; and
- a finger extending in the first direction from a first edge of a third hole provided in the top plate of the second bezel, a space being provided between the finger and a second edge of the third hole opposite to the first edge,
- wherein when the top bezel is assembled to the main bezel, the rib is accommodated in the space and is engaged with the finger such that the top bezel is prevented from moving in a third direction opposite to the first direction relative to the main bezel.

According to an embodiment of the present disclosure, the first bezel and the second bezel are integrally formed.

According to an embodiment of the present disclosure, the outer surface of the top bezel is coated with an aluminum layer.

The present disclosure further provides a lighting device including the above bezel device.

The present disclosure further provides a motor vehicle including the above lighting device.

With the bezel device, the lighting device and the motor vehicle according to the present disclosure, the bezel device is formed to include two parts, i.e. the main bezel and the top bezel. By aluminizing only the top bezel and forming the portion to be aluminized through the top bezel after the top bezel is assembled with the main bezel, the aluminizing of the bottom surface of the groove in the upper bezel can be easily achieved and the boundary of the aluminized portion is clear, greatly improving the appearance of the vehicle. At the same time, the problem that the top bezel and the main bezel are thin such that it is difficult to fix the top bezel by screw is overcome by means of a plurality of clipping devices, so that the top and main bezels of the thin plate structure are reliably connected without the use of screws. Moreover, the use of the clipping device enables the main bezel and the top bezel of the bezel device to form a close and firm face-to-face contact, and further avoids the possibility of damaging the aluminum layer on the top bezel and the surface of the transparent upper bezel when a connection method such as using a screw or welding which may further destroy the appearance of the bezel device is adopted.

The present application is also intended to provide a gas guiding device, which has a simple structure, occupies a relatively small space and may also guide an airflow for both heat dissipation and ventilation purposes.

The present application is also intended to further provide a lighting and/or signaling device which has the gas guiding device and may not only facilitate heat dissipation of the lightning and/or signaling device itself but also obtain a technical effect of preventing a condensation of moisture cm the lightning and/or signaling device.

Following technical solutions are adopted in exemplary embodiments of the present disclosure for achieving the above desired technical purposes.

According to an embodiment of the present disclosure, it provides a gas guiding device for a lighting and/or signaling device, comprising: a gas channel, which extends in the gas guiding device and has two ends, one of the two ends being opened to one or more readily condensable locations of the lighting and/or signaling device; and a flow guiding component, which is disposed between the other end of the two ends of the gas channel and a heat sink of the lighting and/or signaling device, and is provided with an air inlet side located immediately adjacent to and in fluid communication with the other end of the gas channel and an air outlet side located upstream of the heat sink and facing towards the heat sink, wherein the flow guiding component is configured to extract an air flow at the air inlet side and to blow the air flow towards the air outlet side; and wherein the gas channel is arranged to guide at least a portion of the air flow by the extraction of the flow guiding component to flow through the one or more readily condensable locations of the lighting and/or signaling device.

According to a further embodiment of the present disclosure, the air inlet side of the flow guiding component is constructed to open to an ambient environment such that the air inlet side is configured to extract the air flow from the ambient environment.

According to a further embodiment of the present disclosure, the gas channel is arranged downstream of the air outlet side of the flow guiding component, and is also configured to be provided with an upper wall portion, which is inclined to inside of the gas channel, at the other end of the gas channel in communication with the flow guiding component, the upper wall portion deflecting and guiding a portion of the air flow blown from the flow guiding component into the gas channel, with remainder of the air flow blown from the flow guiding component flowing towards the heat sink.

According to a further embodiment of the present disclosure, the air inlet side of the flow guiding component is configured to be sealed off from an ambient environment such that the air inlet side is configured to extract the air flow from the other end of the gas channel located immediately adjacent to the air inlet side.

According to a further embodiment of the present disclosure, the flow guiding component is configured to extract the air flow downstream of the other end of the gas channel, and to blow all of the air flow exhausted out of the other end of the gas channel towards the heat sink.

According to a further embodiment of the present disclosure, the gas channel is arranged circuitously depending on profiles of internal components inside the lighting and/or signaling device and spaces inside the lighting and/or signaling device, to form a plurality of corners therein and to point essentially towards the readily condensable locations.

According to a further embodiment of the present disclosure, except for a single reduced cross section which is provided at a downstream side immediately adjacent to at least one corner, cross sections of the gas channel at other locations have a same dimension and shape.

According to a further embodiment of the present disclosure, an enclosed housing is provided around the flow guiding component such that the air flow exhausted out of the gas channel is reflected by the enclosed housing towards the flow guiding component.

According to a further embodiment of the present disclosure, the readily condensable locations comprise a surface or surfaces of an external lens.

According to a further embodiment of the present disclosure, the gas guiding device is provided at an inlet thereof with one of the following: a heater, an opening provided with a labyrinth seal for ventilation, and an opening provided with a filtering membrane or capillaries.

According to a further embodiment of the present disclosure, an additional flow guiding component is provided, at a location of at least one corner inside the gas channel, to face downstream of the gas channel.

According to a further embodiment of the present disclosure, the flow guiding component which is configured to drive the air flow in a predetermined flow path comprises one chosen from a group consisting of the following: a fan, a vacuum suction device, and an air pump.

According to a further embodiment of the present disclosure, the gas guiding device further comprises:
  a temperature and/or humidity sensor, configured to measure a temperature and/or a humidity inside the lighting and/or signaling device; and
  a controller, configured to control the gas guiding device to change flow rate and direction of the air flow depending on results of measurement of the temperature and/or humidity sensor.

According to another embodiment of the present disclosure, it also provides a lighting and/or signaling device, comprising a light source and the gas guiding device.

At least one embodiments of above technical solutions of the present disclosure may obtain effects of saving space, improving heat dissipation and avoiding condensation, with a simple and compact structure having a relative low cost.

BRIEF DESCRIPTION OF THE DRAWINGS

FIG. 15 is a cross-sectional view of the assembled bezel device according to an embodiment of the present disclosure taken along the line 111-111.

DETAILED DESCRIPTION OF PREFERRED EMBODIMENTS OF THE DISCLOSURE

Figure 1:
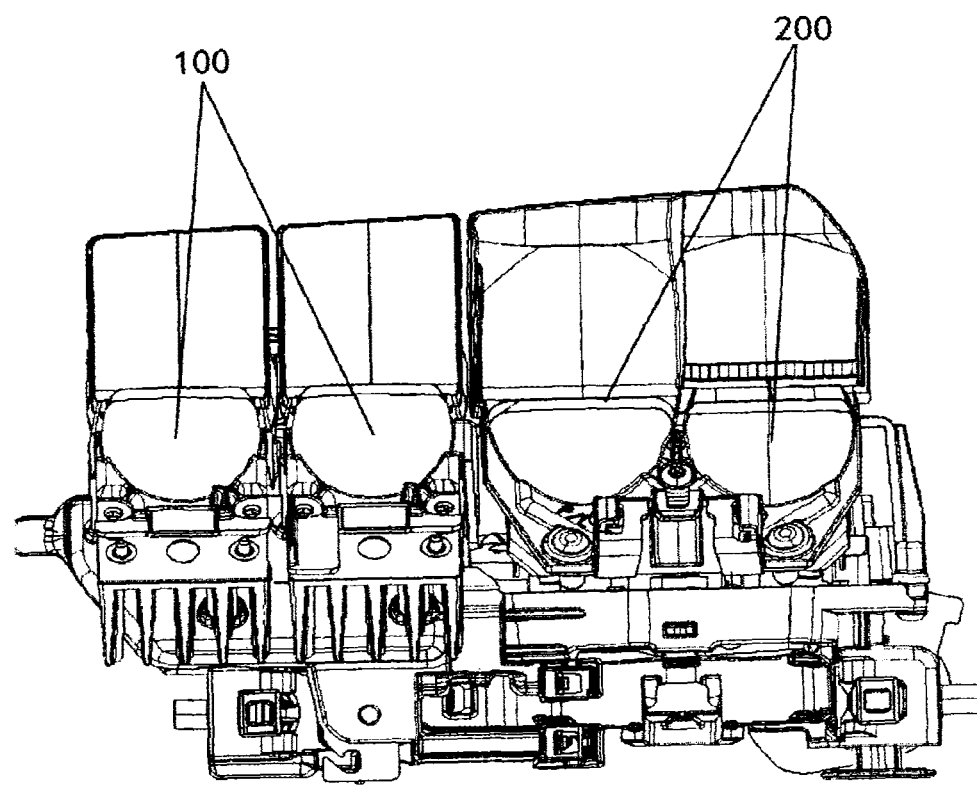
FIG. 1 illustrates a schematic perspective view of a lighting and/or signaling device comprising a HB module 100 and a LB module 200, according to an embodiment of the present disclosure.

Exemplary embodiments of the present disclosure will be described hereinafter in detail with reference to the attached drawings. Throughout the description, the same or similar reference numerals refer to the same or similar elements. The following description of the embodiments of the present disclosure with reference to drawings are intended to explain the generic concept of the present disclosure, instead of being understood as limitation to the present application.

According to a general concept of the present disclosure, it provides a regulating assembly for a light source, comprising: a supporting frame, which is coupled in a displaceable manner to the light source; a rotatable fixed regulating portion, which is fixed rotatably at an anchor point on the light source, and is configured to have one rotation degree of freedom at the anchor point; and a horizontal regulating portion and a vertical regulating portion. Each of the horizontal regulating portion and the vertical regulating portion is in a form of a ball-headed screw-thread part and comprises: a rod-shaped body, which is restricted to be movable forwards or backwards only in a corresponding one of a horizontal direction and a vertical direction; and a ball head, which is formed on the rod-shaped body and accommodated within a spherical recess on the supporting frame, the spherical recess being opened partially towards the ball head in the corresponding one of the horizontal direction and the vertical direction. The ball head is configured to be movable only forwards or backwards driven by the rod-shaped body, in the corresponding one of the horizontal direction and the vertical direction, and is further configured to be propped turnably against an inner wall of the spherical recess in a direction deviated from a direction in Which the rod-shaped body moves.

Figure 2A:
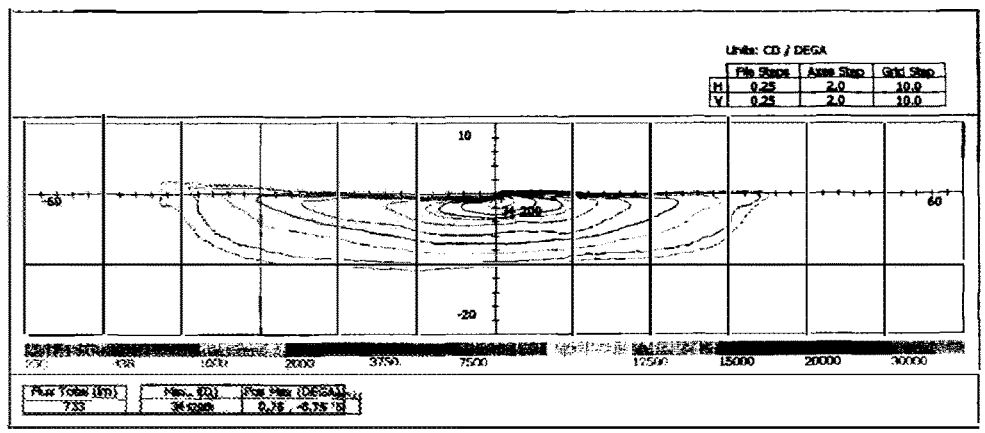
FIG. 2(a) and FIG. 2(b) illustrate schematic views of light profiles of a LB irradiation mode and a HB irradiation mode, respectively, in the lighting and/or signaling device as illustrated in FIG. 1.
Figure 2B:
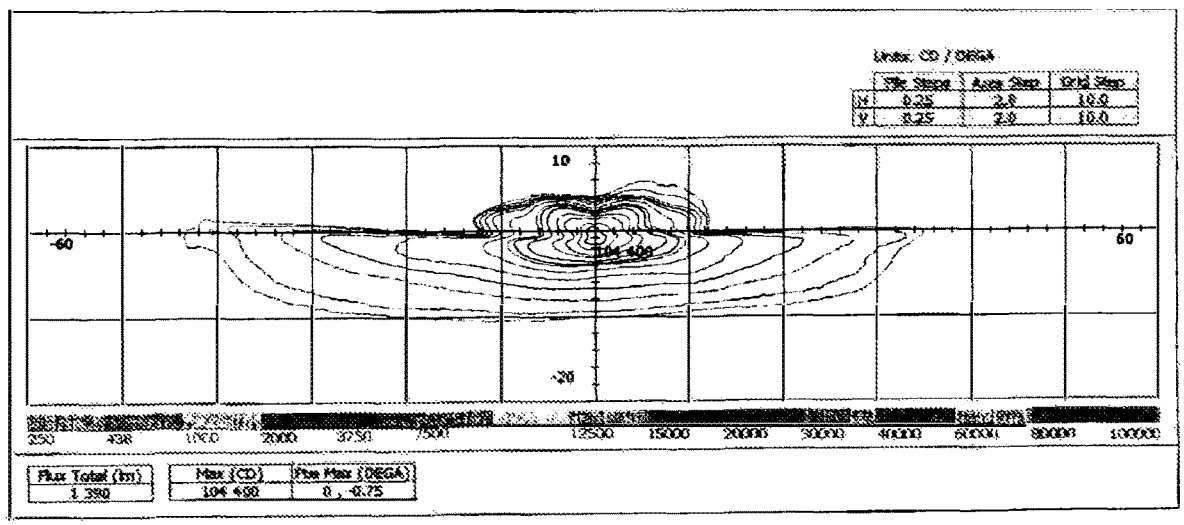

FIG. 1 illustrates a schematic perspective view of a lighting and/or signaling device, comprising a HB module 100 and a LB module 200, as illustrated, according to an embodiment of the present disclosure. And FIG. 2(a) and FIG. 2(b) illustrate schematic views of light profiles of a LB irradiation mode and a HB irradiation mode, respectively, in the lighting and/or signaling device as illustrated in FIG. 1. Once the vehicle lamp operates in the LB irradiation mode, only the LB module is turned on to emit light so as to generate a LB optical pattern; whereas once the vehicle lamp operates in the HB irradiation mode, both the LB module and the HB module are turned on simultaneously to emit light collectively so as to generate a HB optical pattern. By a comparison between the illustrations of FIG. 2(a) and FIG. 2(b), it may be seen clearly that, contribution of the HB module to the profile of the HB optical pattern which is formed in the HB irradiation mode by a cooperation between the HB module and the LB module is: a portion of the light profile above an abscissa axis marked by numerals as illustrated in FIG. 2(b).

Therefore, it is typically required to adjust the HB module which functions as the extension lighting module so as to implement an accurate optical combination between the LB module and the HB module, and in turn to implement the desired HB optical pattern.

Figure 3:
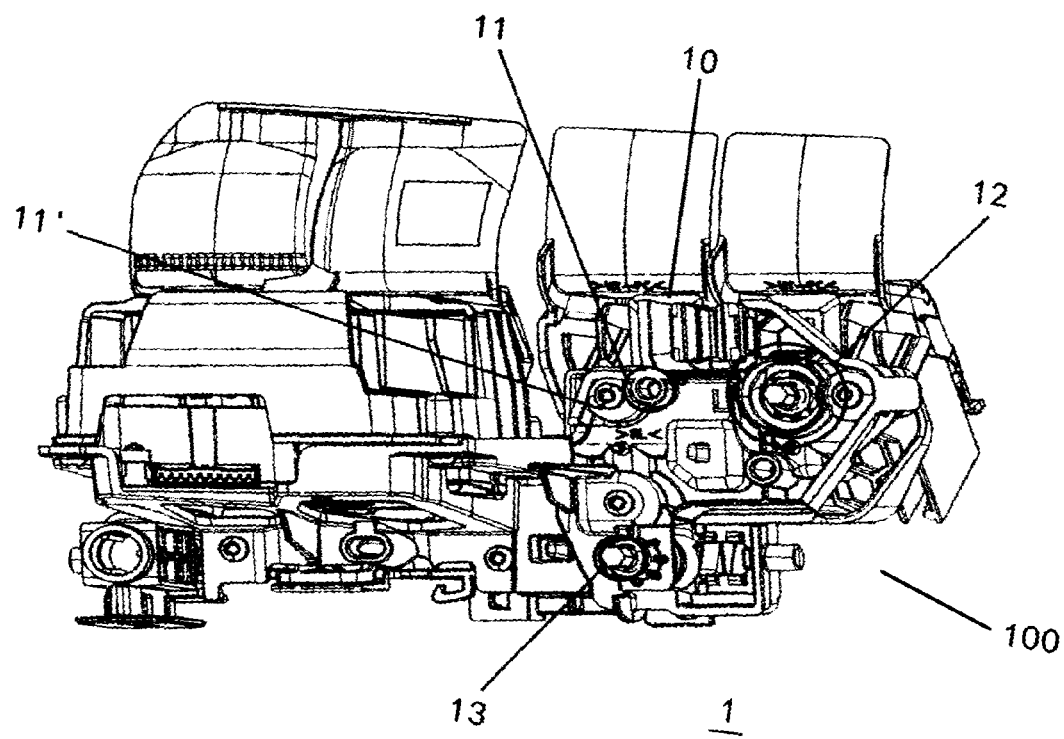
FIG. 3 illustrates a schematic isometric perspective view of the HB module 100 and its regulating assembly 1, of the lighting and/or signaling device as illustrated in FIG. 1, the regulating assembly 1 comprising a fixed regulating portion 11, a horizontal regulating portion 12 and a vertical regulating portion 13 as illustrated.

FIG. 3 illustrates a schematic isometric perspective view of the HB module 100 and its regulating assembly 1, of the lighting and/or signaling device as illustrated in FIG. 1, the regulating assembly 1 comprising a fixed regulating portion 11, a horizontal regulating portion 12 and a vertical regulating portion 13 as illustrated.

In an exemplary embodiment of the present disclosure, in consideration that the HB module needs both horizontal and vertical adjustments individually and independently form each other so as to diminish or even eliminate completely the process deviations and the stack-up or accumulative tolerances during manufacturing and assembling processes of products so as to implement a match between the final HB optical pattern and the desired HB optical pattern, as illustrated m FIG. 3, the regulating assembly 1 of the HB module 100 may for example comprise a supporting frame 10 disposed thereon which functions as a basic part of the regulating assembly 1. By way of example, the supporting frame is formed as a truss structure, e.g., formed by metal extensions such as steel rebar and the like. Its deformations at different locations thereof are considered not to impose any influence on other locations located far away therefrom.

The regulating assembly 1 further comprises a fixed regulating portion 11, a horizontal regulating portion 12 and a vertical regulating portion 13, and each of the horizontal regulating portion 12 and the vertical regulating portion 13 may for example be selected to be in a form of a ball-headed screw-thread part which is displaceable linearly along respective axis. As an example, the horizontal regulating portion 12 moves horizontally while the vertical regulating portion 13 moves vertically such that the horizontal regulating portion pushes horizontally and tire vertically regulating portion pushes vertically, respectively against corresponding locations on the supporting frame 10 to which they are connected movably.

Furthermore, each of the horizontal regulating portion 12 and the vertical regulating portion 13 is provided with a tip of the ball shape which is applicable to rotate freely within a corresponding one of ball sockets formed on the supporting frame 10 of the HB module 100. The supporting frame 10 may be regarded as a common reference for the horizontal regulating portion 12 and the vertical regulating portion 13, at an anchor point where the fixed regulating portion is seated, and the fixed regulating portion 11 is constructed to adjust the supporting frame 10 e.g., by a reference regulating screw-thread part 11' disposed adjacent to the fixed regulating portion (e.g., by turning a regulating nut, such as a hexagonal screw nut and the like, for facilitating the adjustment), so as to compensate respective rotations of the horizontal regulating portion 12 and the vertical regulating portion 13 at the lip of the ball shape thereof. Essentially, as illustrated in FIG. 3, the fixed regulating portion 11 is for example fixed at a certain point, e.g., all translational degrees of freedom thereof have been restricted. The fixed regulating portion 11 may also be constructed to be in a form of a ball-head shape, and configured to be fitted with a ball-head retaining member provided adjacent thereto on the supporting frame 10 of the HB module 100 such that the fixed regulating portion 11 can cooperate with the ball-head retaining member and have a rotational degree of freedom in situ.

Figure 4A:
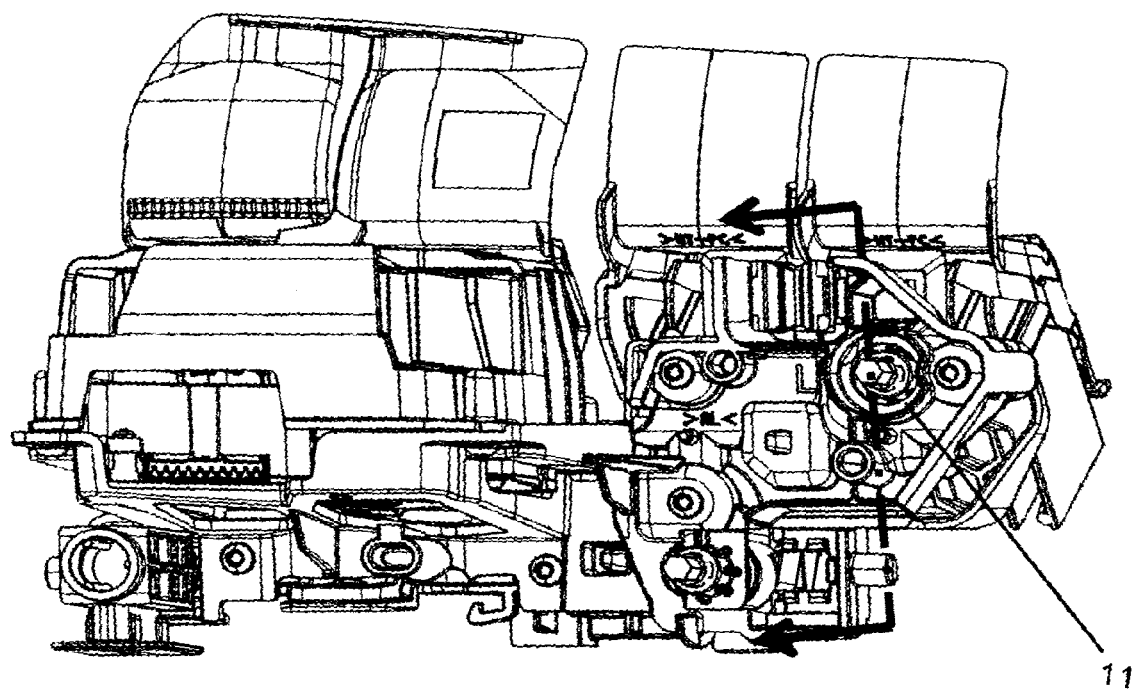
FIG. 4(a) illustrates a schematic isometric perspective view of the lighting and/or signaling device and its regulating assembly 1 as illustrated in FIG. 3, a cutting plane on the horizontal regulating portion 12 being shown therein.
Figure 4B:
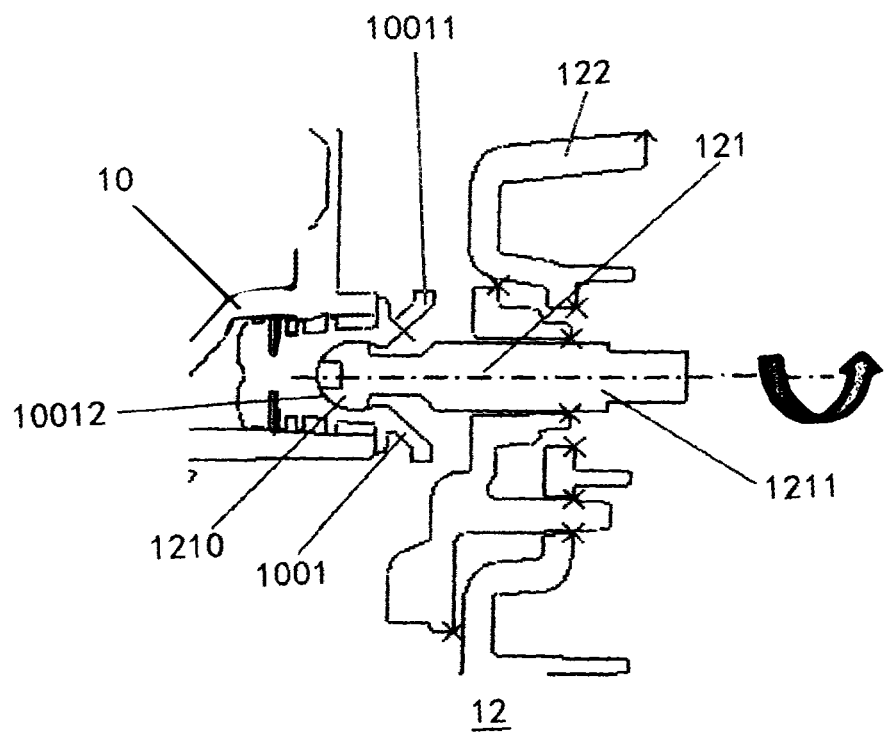
FIG. 4(b) illustrates a schematic sectional view of the horizontal regulating portion 12 as illustrated in FIG. 4(a) which is cut along a line A-A.
Figure 4C:
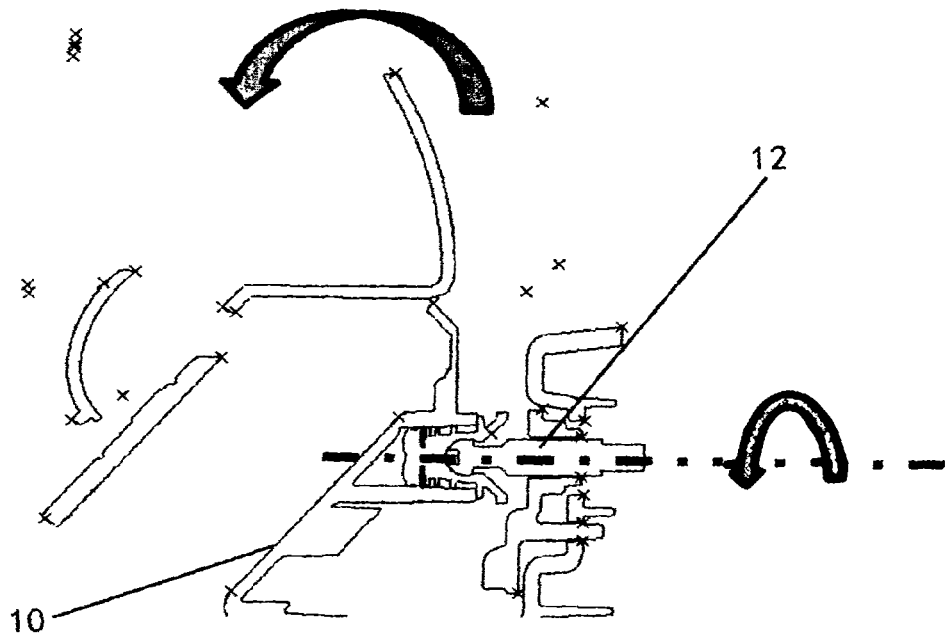
FIG. 4(c) illustrates a schematic view of an operation condition of the horizontal regulating portion 12 as illustrated in FIG. 4(b).

Furthermore, as illustrated in FIG. 4(a) to FIG. 4(c), FIG. 4(a) illustrates a schematic isometric perspective view of the lighting and/or signaling device and its regulating assembly 1 as illustrated in FIG. 3, a cutting line on the horizontal regulating portion 12 being shown therein; FIG. 4(b) illustrates a schematic sectional view of the horizontal regulating portion 12 as illustrated in FIG. 4(a) which is taken along a line A-A; and FIG. 4(c) illustrates a schematic view of an operation condition of the horizontal regulating portion 12 as illustrated in FIG. 4(b).

In an exemplary embodiment of the present disclosure, especially as illustrated in above figures, from the section taken along the line A-A in FIG. 4(b), it can be known that, taking the horizontal regulating portion 12 as an example, the horizontal regulating portion 12 comprises a ball-headed screw-thread part 121 which functions as a key regulating component. The ball-headed screw-thread part 121 further includes a regulating ball head 123 and a screw-threaded pan body 124 which is for example a screw-threaded rod formed integrally with the regulating ball head 123 at the tip of the horizontal regulating portion. The screw-threaded part body 124 is installed on a stationary horizontal regulating fixture support 122 throughout a channel formed therein, and is restricted hereby correspondingly to be displaceable horizontally by turning it, e.g., at a base portion of the screw-threaded part body 124. For facilitating the turning operation, the base portion of the screw-threaded part body 124 is for example formed to have a shrunk sectional shape. With such shrunk sectional shape, the base portion is easier to be turned by a baud directly. Alternatively, with such shrunk sectional shape, a hexagonal nut may be easier to be mounted around the base portion for increasing the friction force applied by hand so as to turn the base portion conveniently by applying a force on the nut. The horizontal regulating fixture support 122 may for example be secured to the lighting and/or signaling device and then may be considered to be stationary.

In an embodiment, the regulating ball head 123 may for example be pivotably accommodated within a ball socket 1001 (e.g., in a form of the ball-head retaining member, as illustrated) formed on the supporting frame 10. Specifically, by way of example, as illustrated in FIG. 4(b), the regulating ball head 123 may for example be pivotably accommodated within a spherical recess 10012 which is formed in the hall socket 1001 and arranged to face towards the ball head 123, and the ball socket 1001 further includes a protruding portion which expands outwards Sum the periphery of the spherical recess 10012 so as to conveniently guide the regulating ball head 123 from outside thereof into the spherical recess 10012 appropriately in place. Thereby, when it is required to regulate the HB module horizontally, by turning the screw-threaded part body 124 (e.g., turning the hexagonal nut which may be optionally provided on the base portion of the screw-threaded part body), the screw-threaded part body 124 may pass through the channel within the horizontal regulating fixture support 122 in the horizontal direction so as to travel forward or backward correspondingly to drive the regulating ball head 123 to move forward or backward, and the regulating ball head 123 may in turn drive the supporting frame 10 horizontally due to a movable fit with the spherical recess 10012 of the ball socket 1001 formed on the supporting frame 10, so as to regulate horizontal positions of the HB module to which the frame 10 is coupled. Certainly, correspondingly, in consideration of the process deviations and the stack-up or accumulative tolerances during manufacturing and assembling processes, the regulating ball head 123 may not necessarily be received within the spherical recess 10012 horizontally, and hence a pushing or pulling action may not necessarily be applied thereon strictly in the horizontal direction, such that in this condition a slight lateral displacement or turning of the whole supporting frame 10 may be caused hereby.

Furthermore, in consideration of the fixed regulating portion 11 which is installed at the anchor point in the regulating assembly, it may only rotate in situ since it is only provided with the single rotational degree of freedom but restricted at all translational degrees of freedom thereof. Therefore, the fixed regulating portion 11 may be adjusted correspondingly to drive the supporting frame 10 in motion, e.g., by turning the adjacent nut correspondingly, to conduct a rotation which may be opposite to an undesired movement of the frame 10 (e.g., turning it) resulting from the adjustment of the horizontal regulating portion 12. In this way, in the adjustment for the compensation in the horizontal direction, the undesired movement of the frame 10 caused by the process deviations and the stack-up or accumulative tolerances during manufacturing and assembling processes may be counteracted; i.e., an independent horizontal adjustment may be obtained, without imposing any impact on the vertical regulating portion 13. The undesired turning caused by aforementioned horizontal adjustment and the compensation therefor can be shown in FIG. 4(*c*).

Similarly, an adjustment on the HB module in the vertical direction is further taken into consideration. The vertical regulating portion 13 may also be in a form of a ball-headed screw-thread part. Moreover, the vertical regulating portion 13 is for example selected to be in the same form of the ball-headed screw-thread part as that of the horizontal regulating portion 12 as illustrated in FIG. 4(*b*), except that the vertical regulating portion is arranged vertically.

Due to the process deviations and the stack-up or accumulative tolerances during manufacturing and assembling processes, the regulating ball head of the vertical regulating portion 13 may not necessarily be received within a corresponding spherical recess vertically, and hence a pushing or pulling action on the corresponding spherical recess which is arranged vertically may not necessarily be applied strictly in the vertical direction, such that in this condition a slight lateral displacement or turning of the whole supporting frame 10 may be caused hereby.

Furthermore, in consideration of the fixed regulating portion 11 which is installed at the anchor point in the regulating assembly 1, it may only rotate in situ since it is only provided with the single rotational degree of freedom but restricted to lack all translational degrees of freedom thereof. Therefore, the fixed regulating portion 11 may be adjusted correspondingly to drive the supporting frame 10 in motion, e.g., by turning the adjacent nut correspondingly, to conduct a rotation which may be opposite to an undesired movement of the frame 10 (e.g., turning it) resulting from the adjustment of the vertical regulating portion 13. In this way, in the adjustment for the compensation in the vertical direction, the undesired movement of the frame 10 caused by the process deviations and the stack-up or accumulative tolerances during manufacturing and assembling processes may be counteracted; i.e., an independent vertical adjustment may be obtained, without imposing any impact on the horizontal adjustment of the horizontal regulating portion 12. The undesired turning caused by aforementioned vertical adjustment and the compensation therefor can be similar to that as shown in FIG. 4(*c*).

In the above embodiments of the present disclosure, the horizontal regulating portion and the vertical regulating portion such as the ball-headed screw-thread part and the tike, and the fixed regulating portion located at the anchor point are adopted, which are associated mutually by a frame provided between the fixed regulating portion and the horizontal regulating portion and the vertical regulating portion; the horizontal regulating portion and the vertical regulating portion may provide the horizontal adjustment and the vertical adjustment respectively, while the fixed regulating portion located at the anchor point is also regulated to offset or overcome the undesired movement of the frame caused by the process deviations and the stack-up or accumulative tolerances, so as to implement the compensation for kinematic errors, resulting in an independent and accurate horizontal adjustment and vertical adjustment.

The lighting and/or signaling device of the present disclosure may be vehicle lamp of a motor vehicle or a non-motor vehicle.

In another aspect of the present disclosure, the lighting and/or signaling device is also provided, comprising the HB module, the LB module and the regulating assembly as described above. The lighting and/or signaling device also has the above advantages of the regulating assembly correspondingly. The details on the above advantages will be omitted herein.

Figure 5:
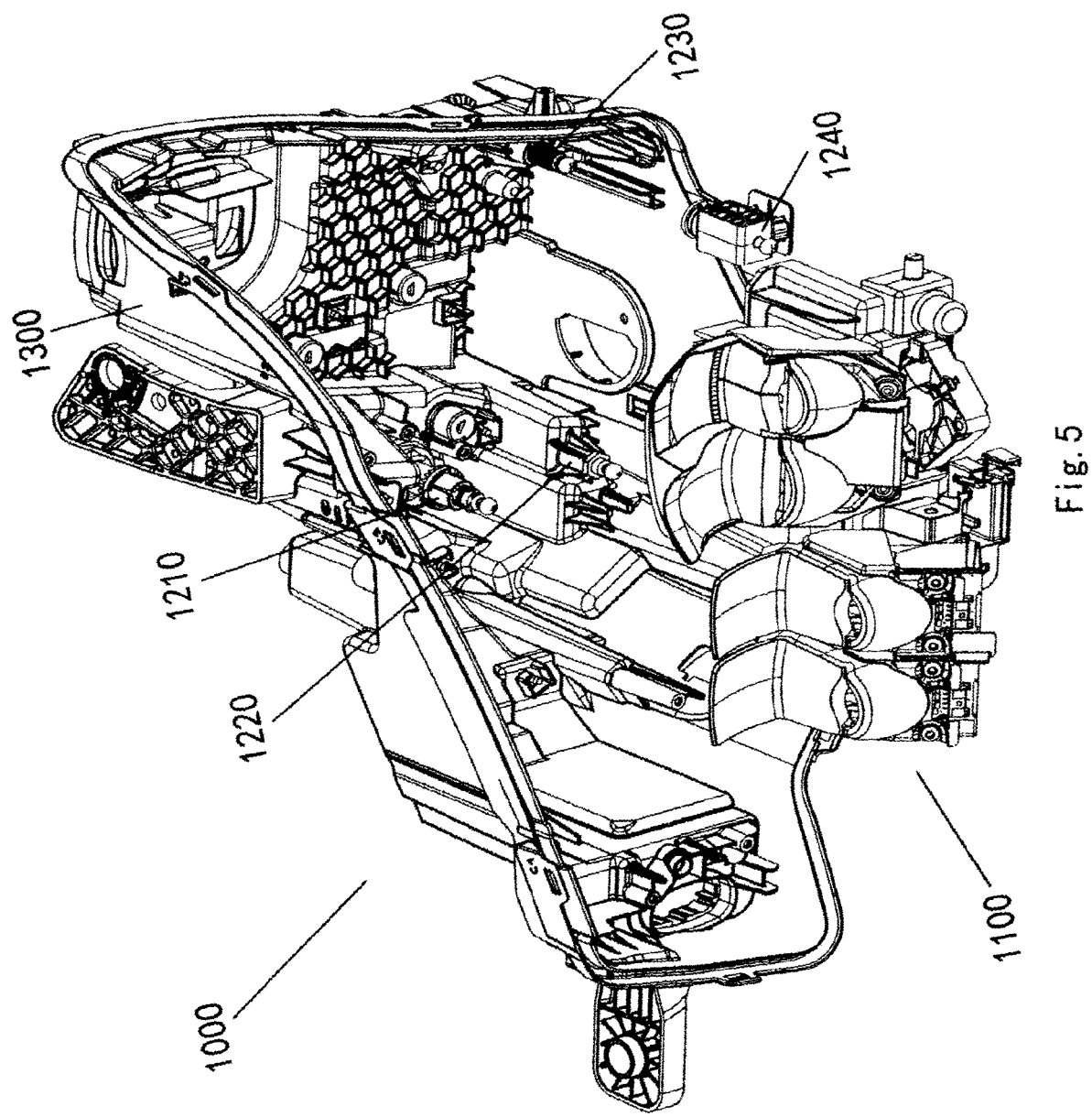
FIG. 5 is a perspective view of a lighting device equipped with an adjusting device for adjusting a lighting module in a lighting device according to the present disclosure.

FIG. 5 is a perspective view of a lighting device 1000 equipped with an adjusting device 1200 for adjusting the lighting module 1100 in the lighting device 1000 according to the present disclosure. The adjusting device 1200 may be an adjusting device for a motor vehicle.

As an example, the adjusting device 1200 may include an adjusting screw 1230, a slider 1240 and a base. A guide groove 1310 is provided in the base. The base is integrally formed on the inner surface of the housing 1300. The adjusting screw 1230 is screwed into the threaded hole in the housing, the slider 1240 is disposed in the housing 1300, and the first end of the adjusting screw 1230 is connected to the slider 1240. The first end may for example be the front end of the adjusting screw 1230. A guide rail 1242 is provided on a bottom surface of the slider 1240, and the guide rail 1242 extends in a first direction. The first direction may be a front and rear direction of the motor vehicle. It can be understood by those skilled in the art that the first direction may be other directions determined depending on the adjustment requirements of the lighting device, for example, the horizontal direction. In the arrangement in which the guide rail 1242 extends in the horizontal direction, the adjusting screw 1230 is primarily subject to the adjustment force in the horizontal direction when the lighting module 1100 is adjusted, instead of an additional force in the direction other than the horizontal direction, A guide groove 1310 is provided on an inner surface of the housing, mid the guide groove 1310 is engaged with the guide rail 1242 of the slider 1240 so that the guide rail 1242 can freely slide in the guide groove 1310 in the front and rear direction of the motor vehicle.

As shown in FIG. 5, the lighting module 1100 is connected to the housing 1300 of the lighting device 1000 via the first connecting bar 1210, the second connecting bar 1220 and the third connecting bar 1220 of the adjusting device 1200. The first connecting bar 1210 and the third connecting bar 1230 are adjusting screws. The adjusting screw 1230 is in thread connection to the threaded hole in the housing 1300 to adjust the spatial position of the lighting module 1100 relative to the housing 1300 within the housing 1300 of the lighting device 1000. The first connecting bar 1210 is aligned with the second connecting bar 1220 in the vertical direction so as to adjust a pitch angle of the lighting module 1100 in a vertical plane. The third connecting bar 1230 and the second connecting bar 1220 are aligned in a horizontal direction so as to adjust the orientation of the lighting module in a horizontal plane. The second connecting bar 1220 is fixedly connected to the housing 1300.

A ball socket is provided at a position of the lighting module 1100 corresponding to the end of each of the first connecting bar 1210, the second connecting bar 1220 and the third connecting bar 1230. A ball head is provided at the end of each of the first connecting bar 1210, the second connecting bar 1220 and the third connecting bar 1230 close to the lighting module 1100. Ball-and-socket connection (i.e., ball joint) is well-known to those skilled in the art and its details will be omitted herein, and the structure may refer to FIGS. 6 and 7.

Figure 6:
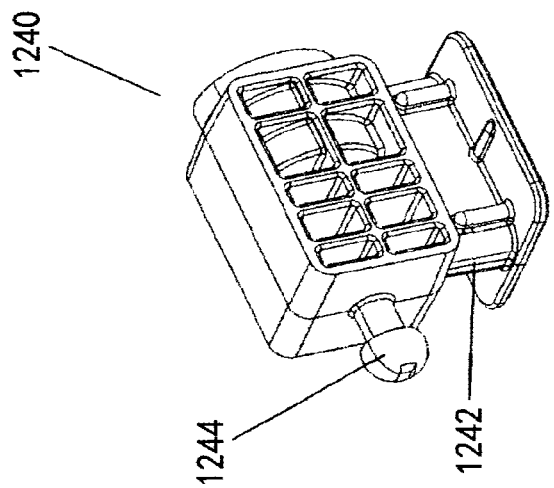
FIG. 6 is a perspective view of a slider of the adjusting device in FIG. 5.
Figure 7:
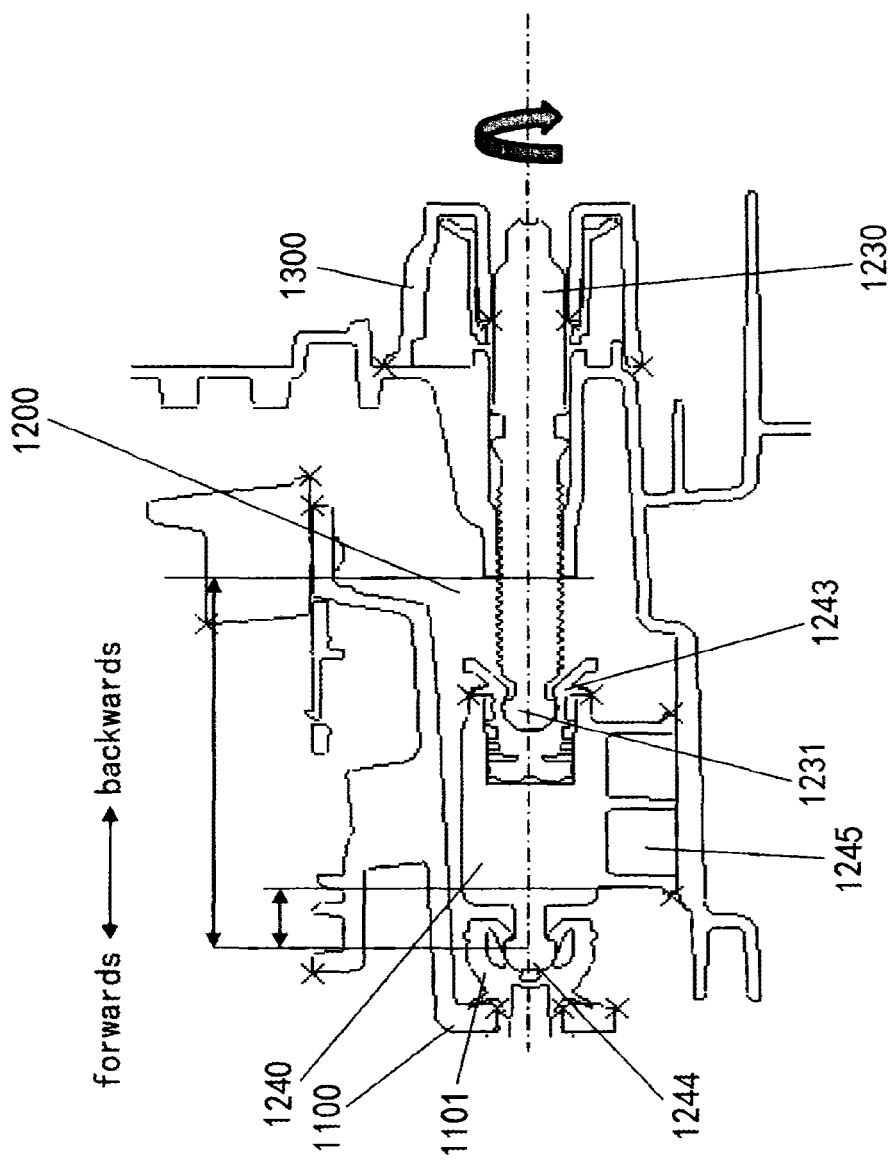
FIG. 7 is a side view of the adjusting device in FIG. 5 assembled with a lighting module.
Figure 8:
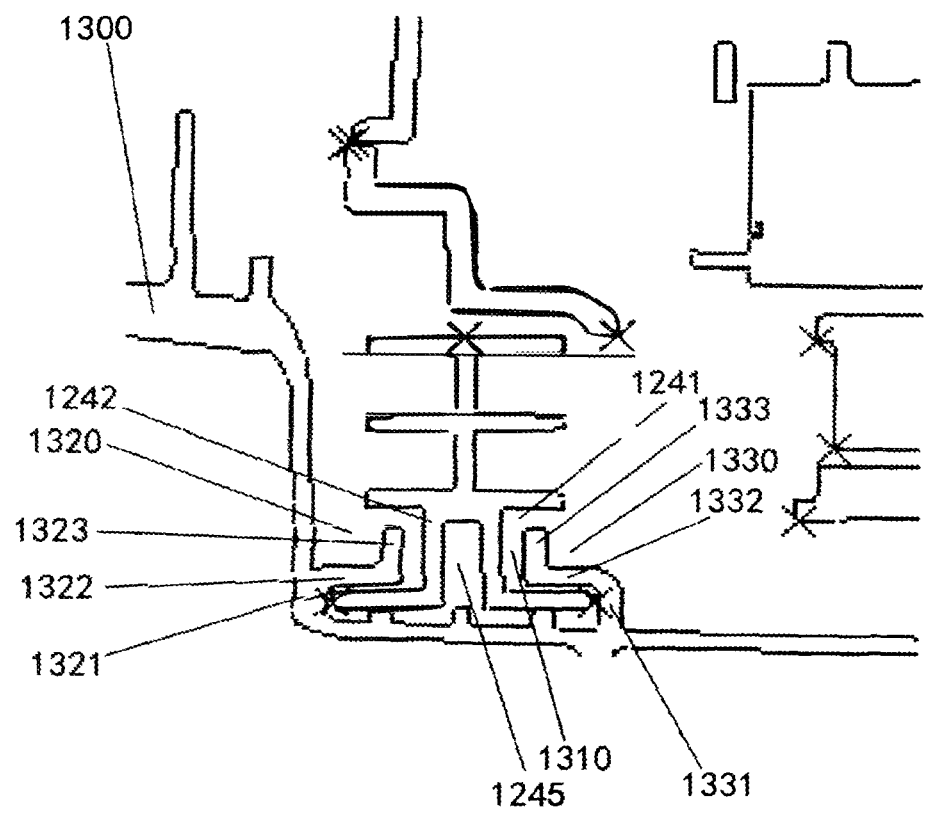
FIG. 8 is a front view of the adjusting device in FIG. 5.

The adjusting device 1200 according to the present invention will be further described below with reference to FIG. 6 to FIG. 8. FIG. 6 is a perspective view of a slider 1240 of the adjusting device 1200 shown in FIG. 5. FIG. 7 is a side view of the adjusting device 1200 shown in FIG. 5. And FIG. 8 is a front view of the adjusting device 1200 shown in FIG. 5.

The adjusting device 1200 further includes a slider 1240. The slider 1240 is disposed within the housing 1300 and has a guide rail 1242 provided on a bottom surface 1241 of the slider 1240. The guide rail 1242 extends in the front and rear direction of the motor vehicle. A guide groove 1310 is provided on an inner surface of the housing 1300 and cooperates with the guide rail 1242 of the slider 1240 so that the guide rail 1242 is freely slidable within the guide groove 1310 only in the front and rear direction of the motor vehicle while prevented from moving in the vertical and left and right directions of the vehicle.

A ball head 1231 is provided at the front end of the adjusting screw 1230 and a ball socket 1243 is provided on a first side of the slider 1240 adjacent to the front end of the adjusting screw 1230. The ball head 1231 on the adjusting screw 1230 cooperates with the ball socket 1243 on the slider 1240, so that the slider 1240 can move in the front-rear direction within the guide groove 1310, driven by the adjusting screw 1230. It should be noted that the ball-and-socket connection between the front end of the adjusting screw 1230 and the slider 1240 is able to compensate for errors formed in the manufacturing process. Such a connection also may change the position and orientation of the adjusting screw 1230 with respect to the slider 1240 when the design of the screw 1230 and the slider 1240 are limited by structures or space, even if the adjusting screw 1230 is not arranged so that its central axis is parallel to the front-and-rear sliding direction of the slider 1240. A ball head 1244 is disposed on a second side of the slider 1240 opposite to the first side, and a ball socket 1101 is disposed on the lighting module. The ball head 1244 on the slider 1240 cooperates with the ball socket 1101 on the lighting module 1100 so that the lighting module 1100 can be moved in the space within the lighting device 1000, driven by the slider 1240.

As an example, the guide rail 1242 may be complementary in shape to the guide groove 1310. This can improve the cooperation between them.

As shown in FIG. 6 and FIG. 8, in the present embodiment, the guide rail 1242 is an inverted T-shaped portion 1242, and the guide groove 1310 is an inverted T-shaped groove. The use of an inverted T-shaped structure simplifies the manufacturing process of the guide rail 1242 and the guide groove 1310 while the strength of the guide rail 1242 and the strength of the guide groove 1310 are ensured. The guide groove 1310 is formed by a first wall 1320 and a second wall 1330 which are protruded from the inner surface of the housing 1300 and are symmetrical with respect to the central plane of the guide groove 1310. The central plane is a vertical plane that is parallel to the front and rear direction of the vehicle. The first wall 1320 and the second wall 1330 each include: a first section 1321, 1331 extending vertically from an inner surface of the housing 1300 and perpendicular to an inner surface of the housing 1300; a second section 1322, 1332 extending parallel to the inner surface of the housing 1300 from an end of the first section 1321, 1331 facing away from the inner surface of the housing 1300 towards the central plane; and a third section 1323, 1333 extending parallel to the first section 1321, 1331 in a direction away from the inner surface of the housing 1300 from an end of the second section 1322, 1332 near the central plane. The guide groove 1310 of the above structure will not increase the overall thickness of the housing. It only needs to form the first wall 1320 and the second wall 1330 at the position where the guide groove 1310 needs to be provided.

After the lighting device 1000 is assembled, the relative position relation of the lighting module 1100, the adjusting screw 1230, the slider 1240 and the housing 1300 is shown in FIG. 7. When the relative spatial position of the lighting module 1100 within the housing 1300 is adjusted, the adjusting screw 1230 is turned by means of a conventional adjusting tool such as a screwdriver so that the adjusting screw 1230 moves relative to the housing 1230 in the front and rear direction. The front and rear movement of the adjusting screw 1230 drives the slider 1240 to move within the guide groove 1310 on the housing 1300 in the front and rear direction through the ball head 1231 and the ball socket 1243. The front and rear movement of the slider 1240 in turn causes the lighting module 1100 to pivot about a vertical axis defined by the first connecting bar 1210 and the second connecting bar 1220 through the ball head 1244 and the ball socket 1101, thereby adjusting the orientation of the lighting module 1100 in the horizontal plane. The use of the ball head 1244 and the ball socket 1101 further overcomes manufacturing and assembling errors, ensuring the reliability and the flexible position adjustment of the lighting module 1100.

In an example, the guide groove 1310 is a dovetail groove, and the guide rail 1242 has a shape complementary to the shape of the guide groove 1310. Complementary shapes of dovetail grooves allow a tight fitting.

According to an embodiment of the present disclosure, a vertical section of the inverted T-shaped portion 1242 of the slider 1240 may further include a recessed portion 1245 formed on a lower surface of the inverted T-shaped portion. This enables the inverted T-shaped portion 1242 of the slider 1240 to be stably supported in the guide groove 1310 on the housing 1300, The slider 1240 may also be hollowed out so that the slider 1240 may be integrally formed by an injection molding process.

The above description with reference to the drawings describes that the slider and the housing realize a movement in the front and rear direction of vehicle only by the T-shaped structure. However, those skilled in the art may understand that the present disclosure is not limited thereto, and any structure that achieves its corresponding function will fall within the protection scope of the present disclosure. For example, the slider and the housing can also realize the horizontal and vertical position stopping functions through the dovetail groove, and at the same time, the movement of the slider in the front and rear direction is ensured.

The present disclosure further provides a lighting device, which includes the adjusting device for the lighting module according to the present disclosure.

The present disclosure further provides a motor vehicle, which includes the above lighting device.

With the adjusting device of the lighting module and the lighting device according to the present disclosure, the length of the third adjusting screw which results in a suspended state of the lighting module in the lighting device is shortened, and the length of the force arm generated by the lighting module relative to the housing of the lighting device is reduced. The possibility of damage to the screw and the housing can be effectively reduced when they are subject to vibration in the vertical direction and the reliability of the lighting device is improved.

Figure 9:
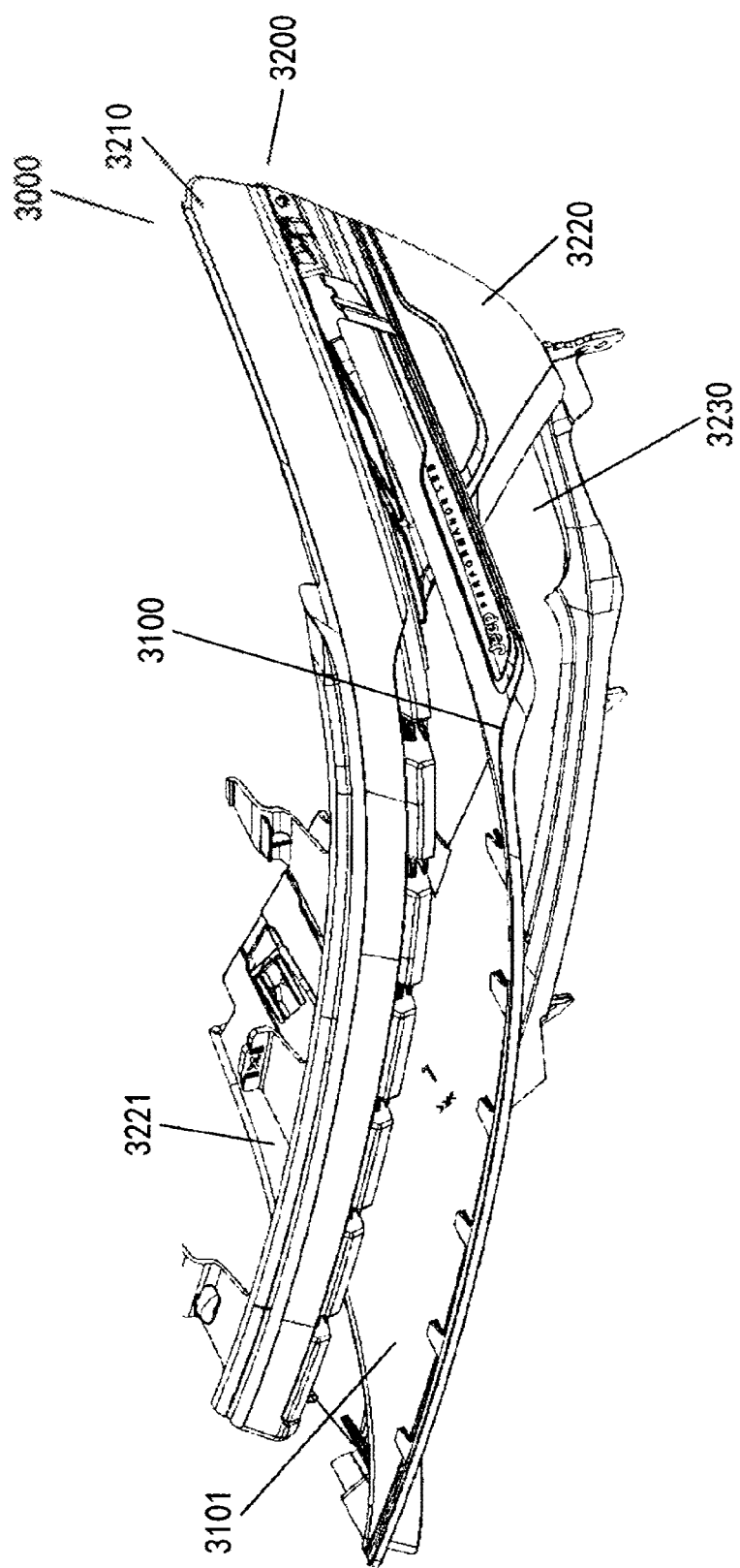
FIG. 9 is a perspective view of a bezel device according to an embodiment of the present disclosure, wherein a part of the top bezel is inserted into the main bezel.

FIG. 9 is a perspective view of the bezel device 3000 according to the embodiment of the present disclosure in which a part of the top bezel 3100 is inserted into the main bezel 3200. The bezel device 3000 may for example be used in a lighting device. The bezel device 3000 includes a top bezel 3100 and a main bezel 3200. The top bezel 3100 has a flat plate-like body 3101, for example, a horizontal flat plate-like body 3101. The main bezel 3200 includes a first bezel 3210 and a second bezel 3220. The present disclosure will be described below in detail with reference to an example in which the first bezel 3210 is a transparent upper bezel and the second bezel 3220 is an opaque lower bezel 3220. A main hole 3230 for receiving a lighting module of the lighting device is formed in the tower bezel 3220. The lower bezel 3220 has a top plate 3221 extending in the first direction above the main hole 3230. The top plate 3221 is horizontal, for example. The first direction is, for example, is the rearward direction of the vehicle. The upper bezel 3210 is connected to the lower bezel 3220 at the front edge of the top plate 3221 and extends upward in front of the front edge. The lower surface of the upper bezel 3210 is flush with the lower surface of the top plate 3221 of the lower bezel 3220. The top bezel 3100 is fixedly connected to the upper bezel 3210 and the lower bezel 3220 by a clipping device such that the upper surface of the flat plate-like body 3101 of the top bezel 3100 is in contact with the lower surface of the horizontal lop plate 3221 of the lower bezel 3220.

Figure 10:
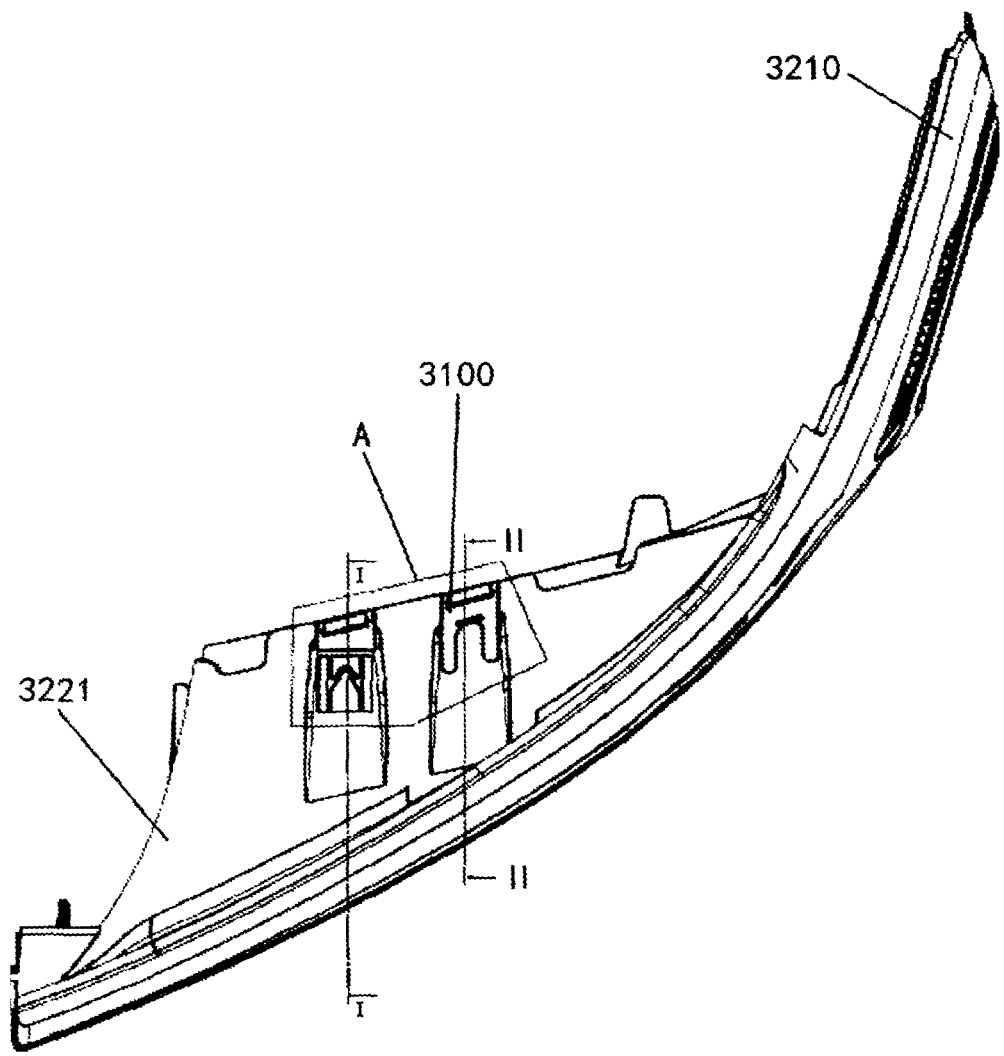
FIG. 10 is a top view of the assembled bezel device in FIG. 9.
Figure 11:
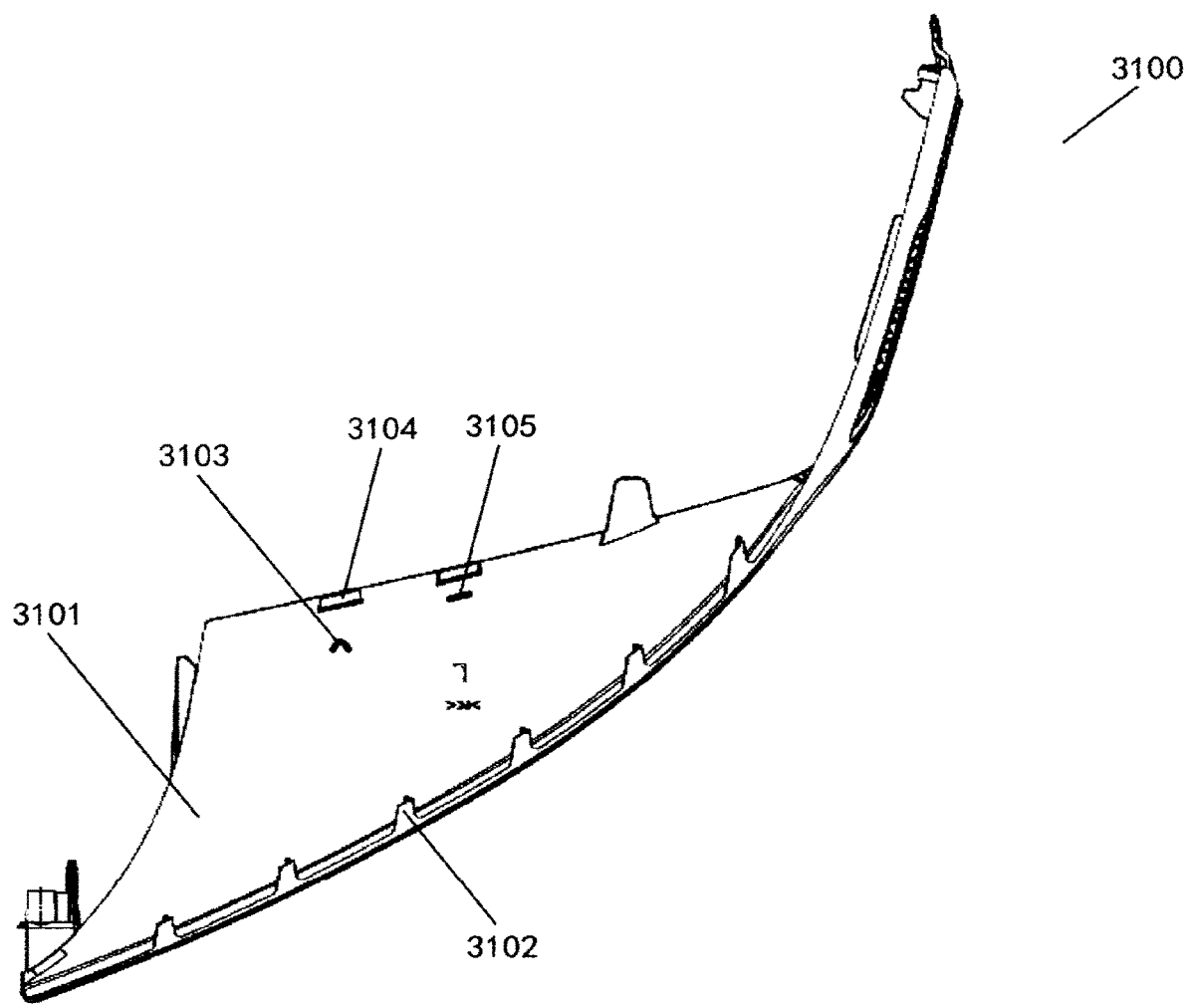
FIG. 11 is a top view of the top bezel of the bezel device in FIG. 9.
Figure 12:
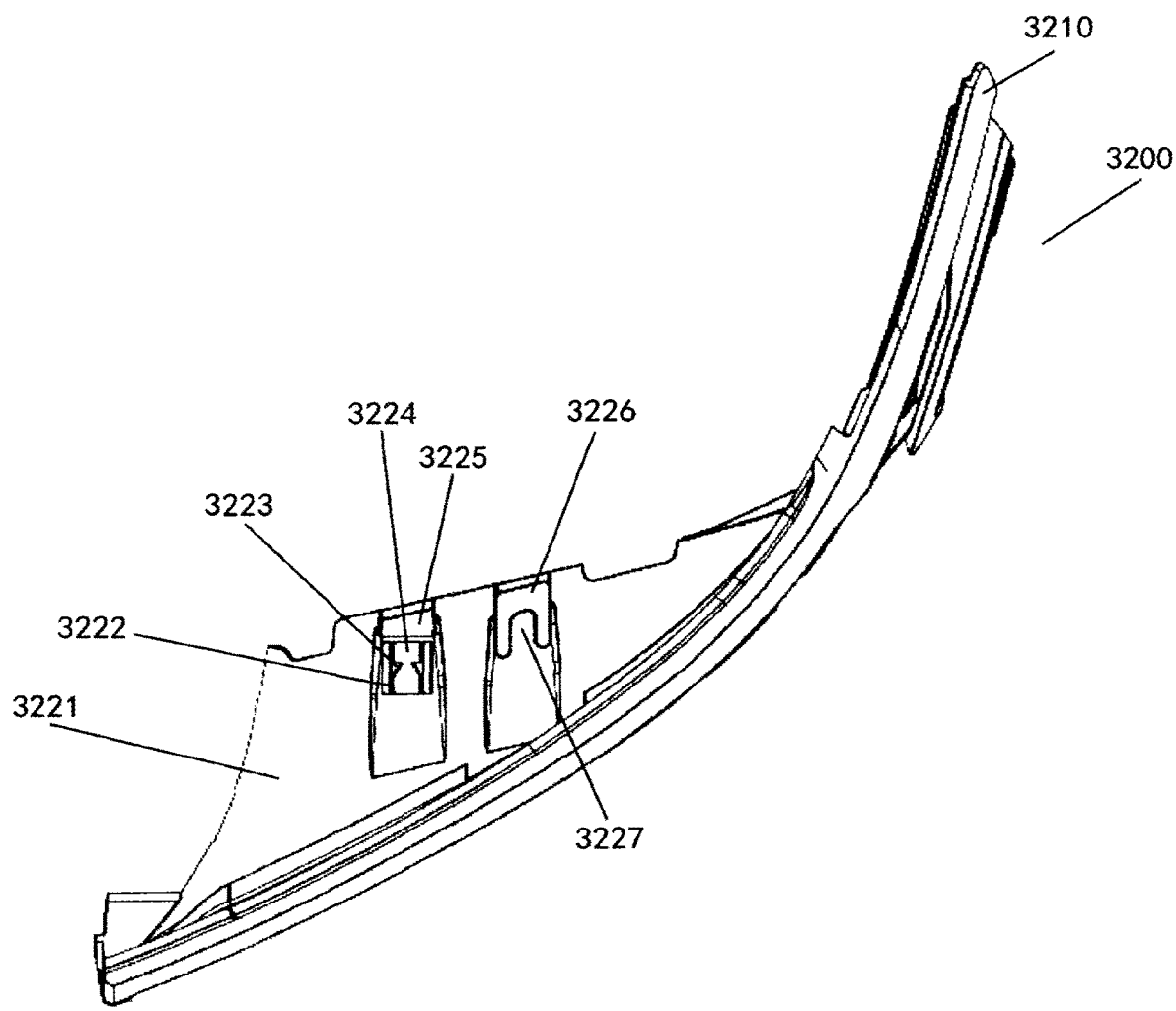
FIG. 12 is a top view of the main bezel of the bezel device in FIG. 9.
Figure 14:
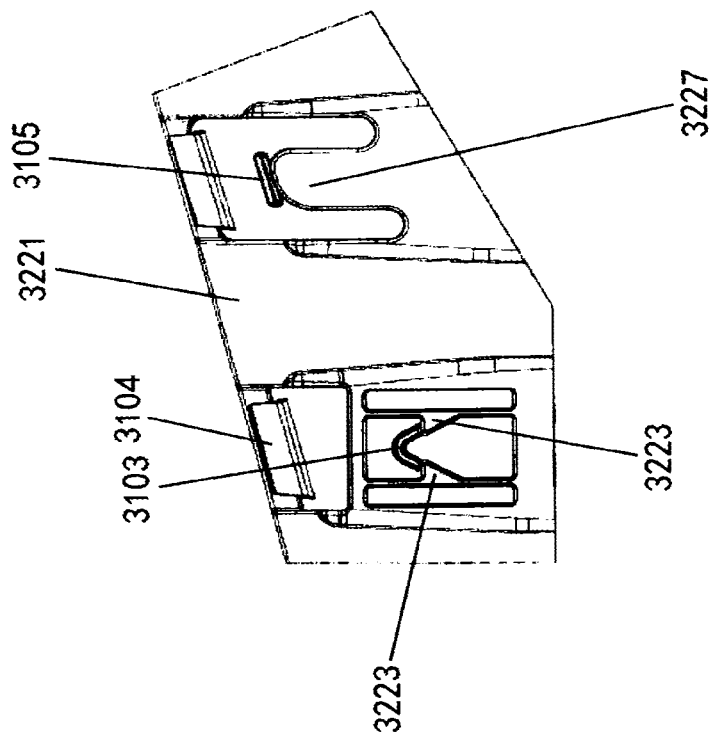
FIG. 14 is a partially enlarged view of area A in FIG. 10.
Figure 13:
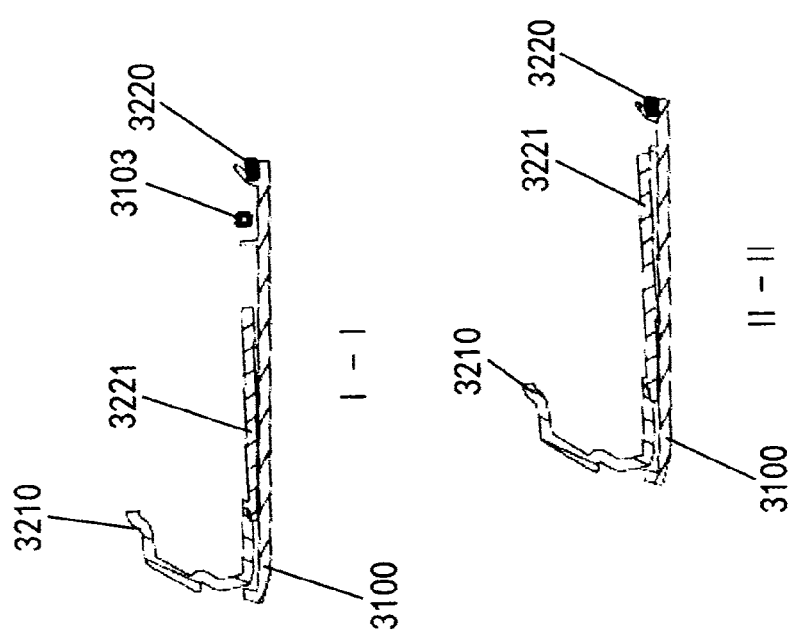
FIG. 13 is a sectional view taken along the lines I-I and II-II in FIG. 10.

The top bezel 3100 and the main bezel 3200 will be specifically described below with reference to FIG. 10 to FIG. 15. FIG. 10 is a top view of the assembled bezel device 3000 shown in FIG. 9; FIG. 11 is a lop view of the top bezel 3100 of the bezel device 3000 shown in FIG. 9; FIG. 12 is a top view of the main bezel 3200 of the bezel device 3000 shown in FIG. 9; FIG. 13 is a cross-sectional view taken along line I-I and line II-II m FIG. 10; FIG. 14 is a partially enlarged view of area A in FIG. 10; and FIG. 15 is a cross-sectional view taken along line Ill-Ill of an assembled bezel device 3000 according to an embodiment of the present disclosure.

The clipping device between the top bezel 3100 and the main bezel 3200 includes a first slop device, a second stop device, a third stop device and a fourth stop device.

The first stop device includes: at least one groove 3211 provided on one side surface, such as the front surface, of the upper bezel 3210 and at least one barb 3102 provided at a position of the top bezel 3100 corresponding to the groove 3211. The groove 3211 extends in a first direction, and the barb 3102 can cover the entire lower surface of the groove 3211. After the lop bezel 3100 is assembled to the main bezel 3200, the barb 3102 visually forms a part of the groove on the upper bezel 3210 such that the bottom of the groove formed by the upper bezel 3210 and the top bezel 3100 can exhibit a uniform layer of aluminum. According to the embodiment of the present disclosure, an aluminum layer is coated on outer surface of the barb 3102, so that the bezel device 3000 presents a good optical appearance. The barb 3102 engages with the groove 3211 such that the top bezel 3100 is prevented from moving in the first direction with respect to the main bezel 3200. In accordance with one embodiment of the present disclosure, the outer surface of the barb 3102 that can be viewed from the exterior of the vehicle is coated with an aluminum layer.

The second stop device includes an arc-shaped protrusion 3103 disposed on the upper surface of the flat plate-like main body 3101 of the top bezel 3100 and two resilient arms 3222 disposed in the top plate 3221 of the lower bezel 3220. The arc-shaped protrusion 3103 has an apex and two ends facing a third direction. For example, in the embodiment of the present disclosure, the third direction is a forward direction of the vehicle opposite to the first direction. The end surfaces of the two end portions are parallel to the second direction of the vehicle and perpendicular to the upper surface of the flat plate-like main body 3101 of the top bezel 3100. The second direction is perpendicular to the first direction. The second direction is, for example, the left-right direction of the vehicle. The two resilient arms 3222 are bridged in parallel in the first direction of the vehicle in a first hole 3224 penetrating through the top plate 3221 in the thickness direction of the top plate 3221. Each of the resilient arms is provided with a lateral protrusion 3223 extending towards the other resilient arm. The lateral protrusion 3223 has a rear surface extending parallel to the left and right direction of the vehicle and perpendicular to the upper surface of the top plate and an inclined surface that is inclined at an angle to the first direction and extends perpendicular to the upper surface of the top plate. When assembled, the arc-shaped protrusion 3103 moves in the first direction from the front of the lateral protrusion 3223 and the arc-shaped surface on two sides of the apex of the arc-shaped protrusion 3103 forces the lateral protrusions 3223 and the resilient arms 3222 to move away from the apex of the arc-shaped protrusion 3103 in the leftwards direction and the rightwards direction) respectively. When the arc-shaped protrusion 3103 is further moved in the first direction, two ends of the arc-shaped protrusion 3103 passes across the lateral protrusions 3223, and the two lateral protrusions 3223 return to their initial positions under the action of the resilient arms 3222. At this lime, the end surface of each arc-shaped protrusion 3103 cooperates with the rear surface of the corresponding lateral protrusion 3223 so that the movement of the top bezel 3100 in the third direction with respect to the main bezel 3200 is prevented.

The third stop device includes a second hole 3225 formed in the top plate 3221 of the lower bezel 3220 and an plate-like inclined portion 3104 inclined from the upper surface of the plate-like main body 3101 of the lop bezel 3100 toward the top plate 3221 substantially in the first direction. The second hole 3225 penetrates through the top plate 3221 in the thickness direction of the top plate 3221. When the top bezel 3100 is assembled to the main bezel 3200, the plate-like inclined portion 3104 passes upward through the second hole 3225 in the top plate 3221 and cooperates with the edge (e.g., rear edge) of the second hole 3225, so as to prevent the top bezel 3100 from moving in the third direction relative to the main bezel 3200.

The fourth stop device includes: a rib 3105 provided on an upper surface of a flat plate-like main body 3101 of the top bezel 3100 and extending in the left and right direction of the vehicle; and a finger 3227 extending in the first direction from a first edge (e.g. front edge) of a third hole 3226 provided in the top plate 3221 of the lower bezel 3220. There is a space between the finger 3227 and a second edge (e.g. rear edge) of the third hole 3226 opposite to the first edge such that when the top bezel 3100 is assembled to the main bezel 3200, the rib 3105 on the upper surface of the flat plate-like main body 3101 of the top bezel 3100 is accommodated in the space. When the top bezel 3100 is assembled to the main bezel 3200, the rib 3105 cooperates with the finger 3227 such that the lop bezel 3100 is prevented from moving in the third direction relative to the main bezel 3200.

According to the embodiment of the present disclosure, a stop device similar to the third stop device may also be formed on the rear edge of the third hole 3226, as shown in FIG. 14. Also, as an example, only one of the other types of slop device described above is shown in the drawings, but those skilled in the art will appreciate that more stop devices having the same configuration may be provided as desired.

For example, a plurality of grooves 3211, for example, six grooves, may be provided on the front surface of the upper bezel 3210 while the same number of barbs 3102 are provided on the top bezel 3100.

According to an embodiment of the present disclosure, the upper bezel 3210 and the lower bezel 3220 are integrally formed, for example, integrally formed by overmoldmg so that the manufacturing of the bezel device 3000 is simplified. The upper bezel 3210 and the lower bezel 3220 can be firmly fixed together. An embodiment in which an aluminum layer is coated on the surface of the top bezel that can be seen from the exterior of the vehicle has been described with reference to the accompanying drawings, but those skilled in the art will appreciate that all outer surfaces of the top bezel may be coated with the aluminum layer. In this way, the masking step in the manufacturing of the top bezel is eliminated, simplifying the aluminum plating process.

The embodiment in which the top plate 3221 of the top bezel 3220 is a flat plate has been described with reference to the drawings, but those skilled in the art will understand that the thickness of the portion associated with the function of the clipping device may be slightly changed depending on the strength requirement of the stop device without departing from the scope of protection of the present disclosure. Although the positioning of the top bezel 3100 in the left and right direction of the vehicle is not explicitly mentioned in the above embodiment, the cooperation of the barb 3102 with the groove 3211 and foe cooperation of the plate-like inclined portion 3104 and the second hole 3225 objectively make it possible to prevent the top bezel 3100 from moving in the left and right direction of the vehicle. Moreover, the top bezel 3100 may also be prevented from moving in the left and right direction of the vehicle by means of other mechanisms provided on the top bezel 3100 and the main bezel 3200, such as a positioning pin provided on the side surface of the top bezel 3100 and a positioning hole provided on the main bezel 3200. In addition, the cooperation of the barb 3102 with the groove 3211 and the cooperation of the plate-like inclined portion 3104 with the second hole 3225 can also prevent the top bezel 3100 from moving in the up and down direction of the vehicle.

When the bezel device 3000 according to the present disclosure is assembled, the top bezel 3100 is at first placed in the main hole 3230 of the main bezel 3200. When foe arc-shaped protrusion 3103 and the plate-like inclined portion 3104 respectively reach the front of the lateral protrusions 3223 in the corresponding first hole 3224 and the position of the second hole 3225, the top bezel 3100 is lifted upwards so that the arc-shaped protrusion 3103 and the plate-like inclined portion 3104 enter the first hole 3224 and the second hole 3225, respectively, and so that the barb 3102 and the groove 3211 are aligned with each other. Then, the top bezel 3100 is pushed rearward so that the barb 3102 is engaged with foe groove 3211, The end surface of each arc-shaped protrusion 3103 is engaged with the rear surface of the corresponding lateral protrusion 3223. The plate-like inclined portion 3104 passes upwardly through the second hole 3225 in the top plate 3221 and is engaged with foe rear edge of the second hole 3225, and the rib 3105 is engaged with the finger 3227. After thus assembled, movement of the top bezel 3100 with respect to the main bezel 3200, for example, in the front and rear direction, the left and right direction, and the up and down direction of the motor vehicle can be prevented.

The present disclosure further provides a lighting device including the above bezel device, for example, a lighting device for a motor vehicle. The present disclosure timber provides a motor vehicle including the above lighting device.

With the bezel device, the lighting device and the motor vehicle according to the present disclosure, the bezel device is formed as two parts, i.e., the main bezel and the top bezel. By aluminizing only the top bezel and forming the portion to be aluminized after the top bezel is assembled with the main bezel, the aluminum plating of the bottom surface of the groove in the upper bezel is easily achieved, and the boundary of the aluminized portion is clear, and the appearance of the vehicle are greatly improved. At the same time, the problem that the top bezel and the main bezel are thin and it is difficult to fix the top bezel by screws is overcome by means of the plurality of clipping devices, thereby reliably connecting the lop bezel and the main bezel of the thin plate structure without screws. Moreover, the use of the clipping device enables the main bezel and the top bezel of the bezel device to form a close and firm contact between contact faces of them. In this way, it may also avoid tire possibility of destroying tire aluminum layer on the top bezel and the surface of the transparent upper bezel due to such as screw or welding connection and further destroying the appearance of the bezel device.

According to a general technical concept of the present disclosure, it provides a gas guiding device for a lighting and/or signaling device, comprising: a gas channel, which extends in the gas guiding device and has two ends, one of the two ends being opened to one or more readily condensable locations of the lighting and/or signaling device; and a flow guiding component, which is disposed between the other end of the two ends of the gas channel and a heat sink of the lighting and/or signaling device, and is provided with an air inlet side located immediately adjacent to and in fluid communication with the other end of the gas channel and an air outlet side located upstream of the heat sink and facing towards the heat sink, wherein the flow guiding component is configured to extract an air flow at the air inlet side and to blow the air flow towards the air outlet side; and wherein the gas channel is arranged to guide at least a portion of the air flow by the extraction of the flow guiding component to flow through the one or more readily condensable locations of the lighting and/or signaling device.

Figure 16:
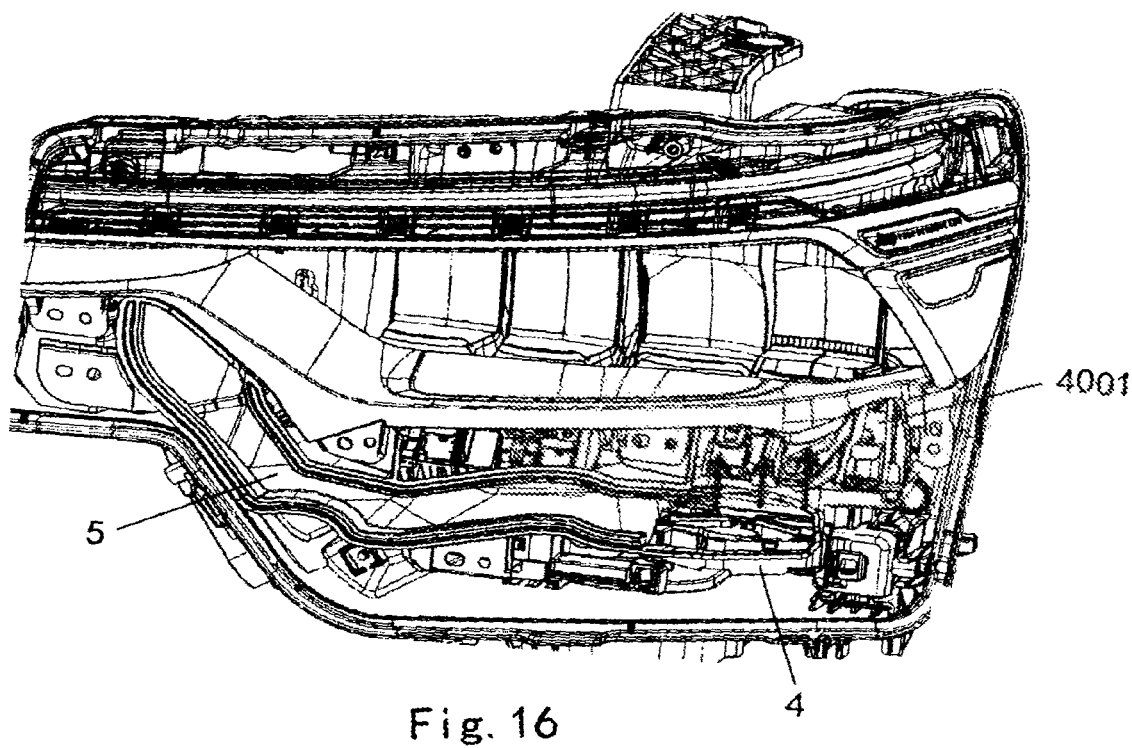
FIG. 16 illustrates a schematic perspective view of a lighting and/or signaling device and a gas guiding device used for it, according to an embodiment of the present disclosure.

FIG. 16 illustrates a schematic perspective view of a lighting and/or signaling device 400 and a front shell containing the same, and a gas guiding device used for it, according to an embodiment of the present disclosure, e.g., illustrating a plurality of light sources 4001 (such as LED modules and the like) and a flow guiding component 1 (e.g., a fan) for guiding the gas (e.g., air) to flow in a direction facing towards the light sources 4001, as well as a gas channel for guiding a flow of an ambient gas (e.g., air) along a flow path different from that defined by the flow guiding component. The light source 4001, e.g., LED modules, may be configured to emit light so as to implement a functionality of lighting and/or signaling. Although merely a single tight source is illustrated m FIG. 16, it should be understood by those skilled in the art that, embodiments of the present disclosure are not be limited thereto, and alternatively, two or more light sources may be adopted for meeting different requirements of lighting and/or signaling. The light source 4001 may be contained in a lamp shell thereof, in particular, other optical component(s) (e.g., a mirror) and/or a structure for meeting requirement of style design of the light thus emitted may also be contained within the lamp shell, besides the light source 4001.

Figure 17:
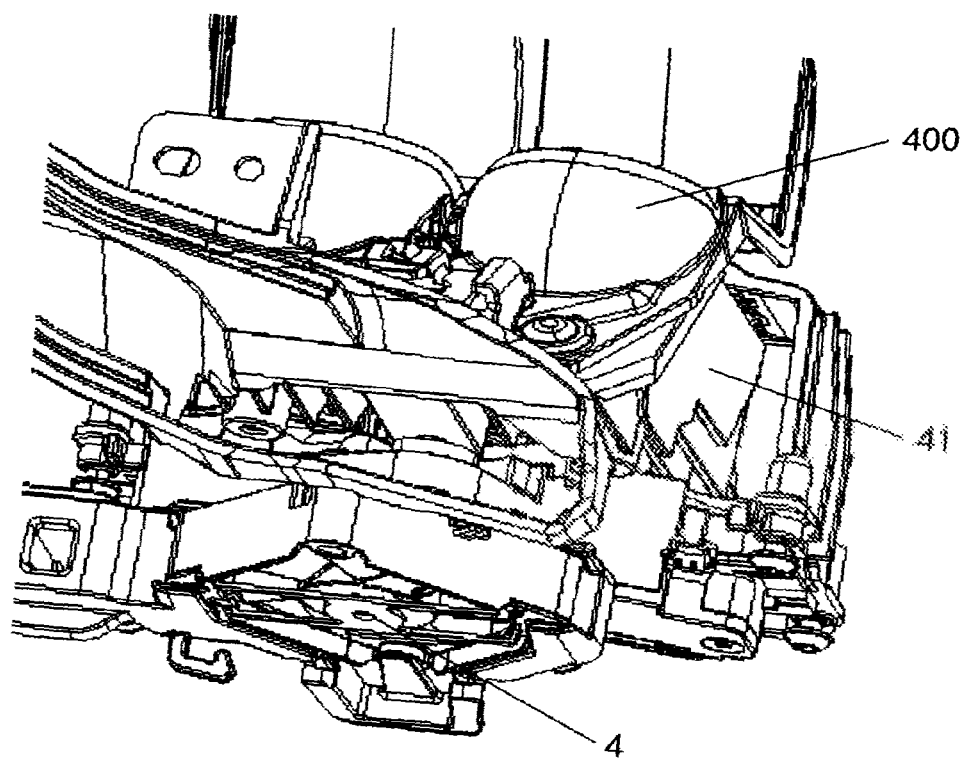
FIG. 17 illustrates an enlarged schematic view of the lighting and/or signaling device of the embodiment as illustrated in FIG. 16, at an airflow suction portion located at a lower right corner thereof.

On one hand, as illustrated in FIG. 16, by way of example, a fan 4 is used to extract air at its air inlet side or adjacent to the air inlet side forcibly and to guide the air to flow at the air outlet side, in a predetermined flow path (e.g., as illustrated in FIG. 16, for extracting air flow at a lower side of the fan which corresponds to the air inlet side of the flow guiding component and blowing air upwards so as to guide the air flow towards the light source 4001). And further in view of FIG. 17, which illustrates an enlarged schematic view of the lighting and/or signaling device of the embodiment as illustrated in FIG. 16, at an airflow suction portion located at a lower right corner thereof, showing that a heal sink 41 provided at the light source 4001 of the lighting and/or signaling device 400. As such, air extracted by the fan 4 directly at the lower side thereof, i.e., at the air inlet side, is blown upwards to the heat sink 41 provided at the light source 4001, so as to have two effects as below: firstly, an airflow at surfaces of the heal sink 4) may be accelerated so as to facilitate a diffusion of heat emitted by the light source to the airflow flowing around the heat sink swiftly so as to accelerate heat dissipation and to ensure normal operation of the light source; secondly, the air surrounding around the light source within the lamp shell may be forced to flow in the predetermined flow path (i.e., in a direction extending from the fan 4 towards the light source 4001 and the heat sink 41, as illustrated in FIG. 16 and FIG. 17) so as to balance a temperature distribution around the light source, i.e., to prevent an imbalance of the temperature distribution at or adjacent to the position of the light source. However, embodiments of the present disclosure are not limited to this. Even if the predetermined flow path for blowing air towards the heat sink 41 of the light source by the fan 4 fails to pass directly through the heat sink 41 and the light source 4001 (e.g., a condition in which the flow path for blowing air by the fan 4 may not be configured to flow through the heat sink directly, due to a restriction of spatial dimension and shape), it is still possible to arrange the flow path for blowing air to flow over surfaces of components and parts which are in a thermal-conductive contact with the heat sink, facilitating airflow around them, so as to obtain an effect of reducing temperature differences among different locations in proximity thereof and to facilitate heat dissipation indirectly. It should be noticed that, in practice, the light source 4001 may not necessarily be a location where the temperature is highest, especially in a condition that a cold light source, e.g., LED, is adopted, an external heat source outside the vehicle lamp (e.g., heat emitted by a motor or a temperature rise caused by illumination of sun ray, and the like) may result in the imbalance of temperature distribution around the light source inside the lamp shell, for example. The flowpath for blowing air by the fan 4 may hereby ensure heat dissipation in these circumstances. Its details will be omitted herein.

On the other hand, two fundamental conditions for producing a phenomenon of condensation are temperature difference and air humidity. Once there is the imbalance of temperature distribution due to a local temperature rise inside the lamp shell and humidity of air is above at a certain level, then a condensation may occur at a local part where there is a relatively low temperature. In the present disclosure, since at the lighting and/or signaling device 400, its outer lens portion may typically function as a light emergent interface with ambient air, i.e., the lighting and/or signaling device 400 and the ambient air are located on both sides of the interface, respectively. Therefore, such interface is a region highly risking in producing the condensation readily; in other words, it is also a region of interest in the disclosure where the condensation is desired to be avoided, so as to avoid any effect on emergent light of the lighting and/or signaling device.

Figure 20:
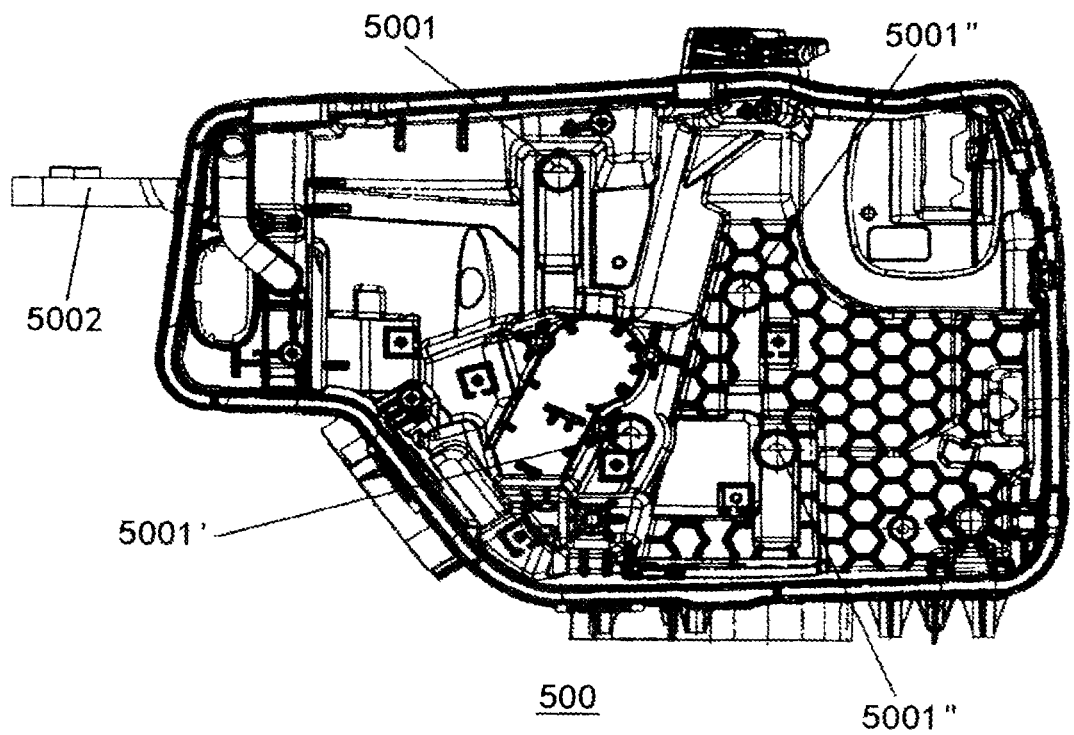
FIG. 20 illustrates a schematic front view of a back chamber shell which is installed to a back side of the lighting and/or signaling device as illustrated in FIG. 16, by snap-fit thereon, and an interior space defined in the chamber shell, as well as the components and parts installed therein, viewed from the aforementioned lighting and/or signaling device and the flow guiding component provided in the device towards interior of a body of the vehicle.

Correspondingly, FIG. 20 illustrates a schematic front view of a back chamber shell which is installed to a back side of the lighting and/or signaling device shown in FIG. 16 and FIG. 17 by snap-fit thereon, and an interior space defined in the chamber shell, as well as the components and pans installed therein. It is observed from aforementioned lighting and/or signaling device and the flow guiding component provided m the device, towards the interior of a body of the vehicle, to view of illustrations of FIGS. 16, 17 and 20, the lighting and/or signaling device 400 and the front shell containing the lighting and/or signaling device 400 as illustrated in FIG. 16 is engaged with the back chamber shell 500 which is installed from a back side thereof by snap-fit as illustrated in FIG. 20, so as to form a seal, hence a completed inner chamber is essentially defined between them, in which an internal circulation of air may occur. Furthermore, as illustrated in FIG. 20, the complete inner chamber is provided with a plurality of ventilation holes at the back chamber shell 500, which ventilation holes are in communication with the external environment, e.g., four ventilation holes 5001, 5001', 5001", 5001''', each of which has one end opened directly to the inside of the back chamber shell 500 facing towards the lighting and/or signaling device located at the front side relative thereto (especially inside of the outer lens portion at the region in which there is high risk of producing the condensation), and the other end communicating with external environment e.g., via a pipe 5002 which leads outwards. And preferably, each of the plurality of ventilation holes is for example configured to be a hole which is normally closed and may be opened unidirectionally once acted on by a positive pressure difference between an internal pressure and an external atmosphere pressure.

Figure 18A:
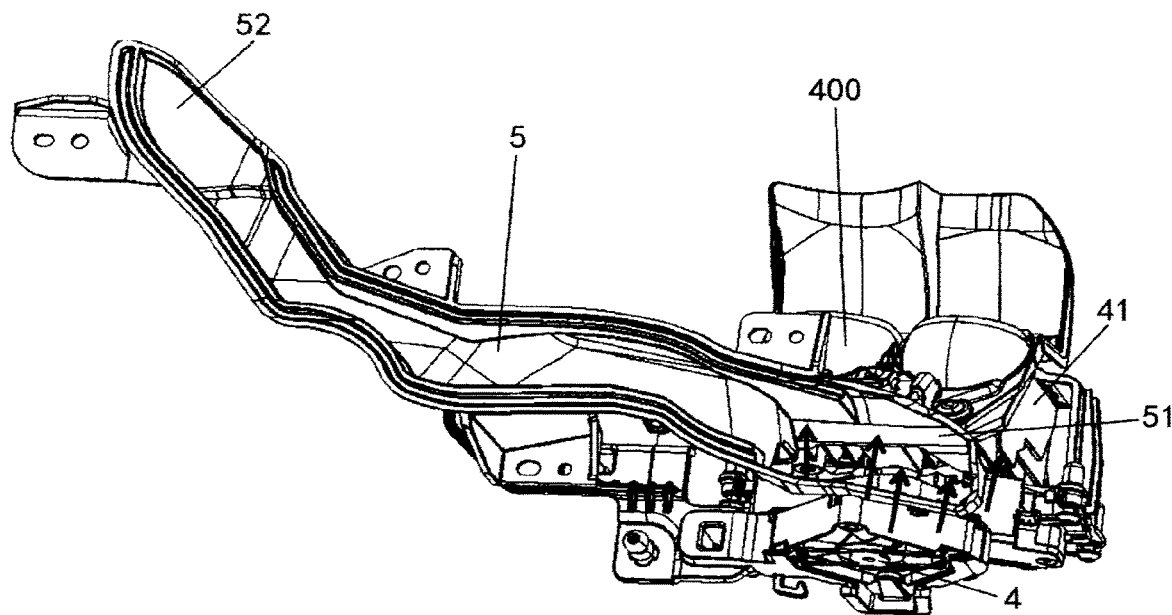
FIG. 18(a) illustrates a schematic front perspective view of the lighting and/or signaling device and the gas guiding device used for it, as illustrated in FIG. 16, the gas guiding device extracting gas at the airflow suction portion located at a lower right corner thereof, with a heat sink being provided at the light source of the lighting and/or signaling device.
Figure 18B:
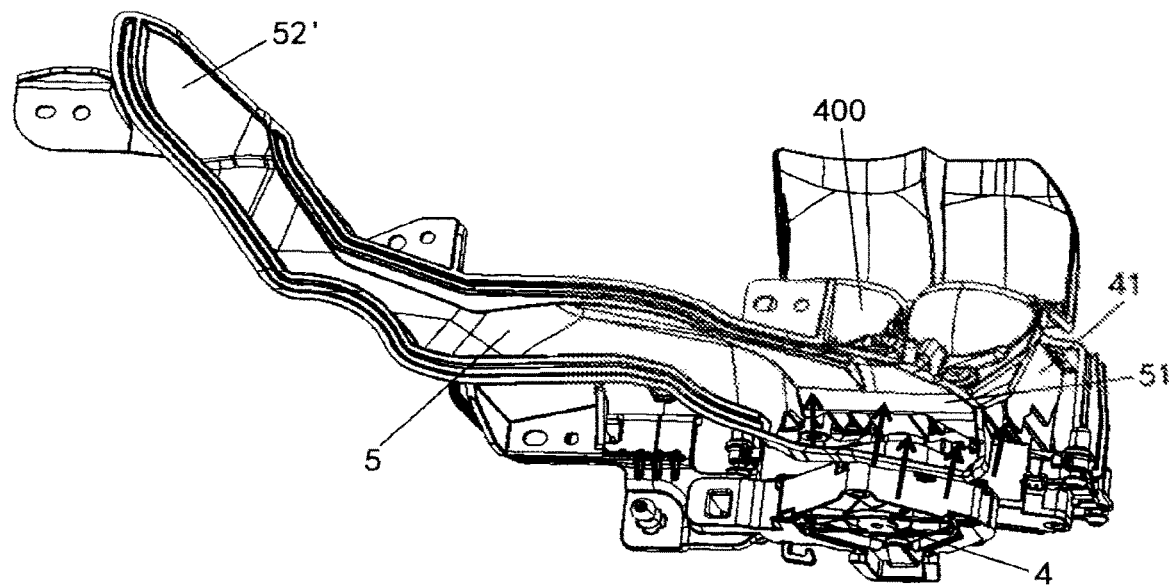
FIG. 18(b) illustrates a schematic front perspective view of the lighting and/or signaling device and the gas guiding device used for it, as illustrated in FIG. 16, the gas guiding device extracting gas at the airflow suction portion which is alternatively located at an upper left corner thereof.
Figure 19:
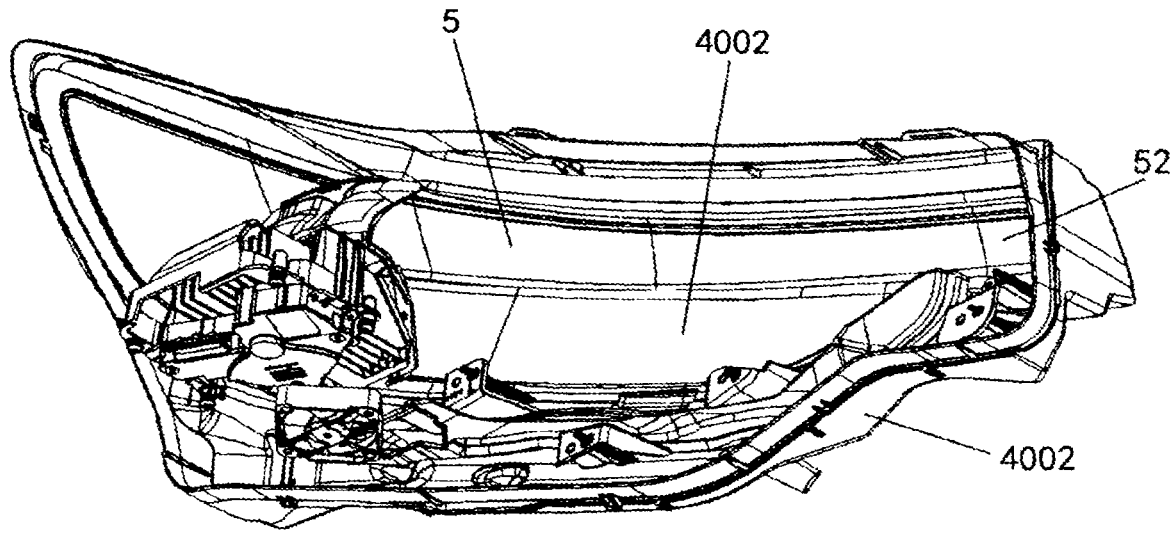
FIG. 19 illustrates a schematic back view of a gas channel of the gas guiding device as illustrated in FIG. 16 to FIG. 18, and a surface of lens which is in contact with it.

Therefore, in an exemplary embodiment of the present disclosure, as illustrated m FIG. 18(*a*), FIG. 19 and FIG. 20, in particular, FIG. 18(*a*) illustrates a schematic front perspective view of the lighting and/or signaling device and the gas guiding device used for it as illustrated in FIG. 16, the gas guiding device extracting gas at the airflow suction portion located at the lower right corner thereof; FIG. 19 illustrates a schematic back view of a gas channel of the gas guiding device as illustrated in FIG. 16 to FIG. 18, and a surface of lens which is in contact with the gas channel. By way of example, the airflow which is blown by the fan 4, may forcibly flow through a gas channel 5 arranged at a downstream side of the fan facing towards a surface of the outer lens, or may flow actively through an alternative gas channel 5 placed alongside the surface of the outer lens. As such, by accelerating the airflow at the surface of the outer lens so as to carry out air molecules having relatively high humidity at the surface of the outer lens and to accelerate elimination of the phenomenon of condensation, and the temperature difference may be inhibited by bringing away the heat accumulated locally inside the outer lens with the airflow so as id prevent phenomenon of condensation from being produced, or eliminate the phenomenon of condensation rapidly if it is presented.

To be specific, as illustrated in FIG. 18(*a*), when the air extracted in by the fan 4 is blown towards the inside of the inner chamber, at least one portion or most of the air may be blown towards the heat sink 41 so as to produce main beat dissipation effect for the lighting and/or signaling device 400, and may for example be exhausted at the heat sink as illustrated in FIG. 17, to a back portion of the inner chamber defined by the back chamber shell 500 as in FIG. 20, while another portion thereof may be deflected and guided at an interface between a passageway located downstream of the fan and the gas channel 5, by a wall portion 51 of the gas channel 5 (e.g., an upper wall portion as illustrated in FIG. 18(*a*)) so as to be guided into the gas channel 5 (i.e., the wall portion 51 functions as an inlet of the gas channel, i.e., may be referring to as 'first channel inlet' hereinafter), and may continue to be pushed further into the gas channel 5. The gas channel 5 is arranged circuitously depending on profiles of internal components and parts inside the lighting and/or signaling device 400 and spaces among the components and parts, to form a plurality of corners therein at relatively small angles inclined among walls of the gas channel and to point generally towards the surface of the outer lens, which function as the region of interest highly risking in producing the condensation readily, for example, and also arranged to open outwards at an uttermost/terminal end 22 (referred to as 'first channel outlet') provided after the surface of the outer lens so as to exhaust air therefrom, such that the air may continue to diffuse to fill the back portion of the inner chamber defined in the back chamber shell 500 as illustrated in FIG. 20; therefore, such a configuration may avoid excessively large loss in momentum of air. Preferably, except for reduced cross sections provided at downstream sides adjacent to several corners, cross sections of the gas channel 5 at other locations have the substantially same dimension and shape, so as to take advantage of the Bernoulli principle to accelerate airflow to ensure that a flow rate of the airflow of air subsequently arriving at the surface of the outer lens is substantially consistent.

Moreover, the airflow which has entered the back portion of the inner chamber defined in the back chamber shell 500 as illustrated in FIG. 20, may continue to flow so as to implement an internal circulation thereof. And in condition that there is a positive pressure difference created when the internal pressure is larger as compared with the external atmosphere pressure (e.g., due to the fact that air is continuously extracted into inside of the inner chamber such that the internal pressure exceeds the external atmosphere pressure, or a thermal balance/equilibrium is destroyed in the inner chamber relative to the external environment such that a positive pressure difference is thus created relative to the external environment), then the ventilation holes 5001, 5001', 5001", 5001''' which are normally closed and may be openede unidirectionally once they are acted on by a positive pressure difference between the internal pressure and the external atmosphere pressure, may be in communication with the external environment and exhaust gas therethrough, until the thermal balance and an equilibrium in pressure are both recovered in the inner chamber relative to the external environment.

In conclusion, in the embodiment as illustrated in FIG. 18(*a*), the flow guiding component such as the fan and the like, may be configured to split the airflow of incoming air by cooperation with the upper wall portion of the gas channel 5 arranged alongside, such that one portion of the airflow of the incoming air may travel over the flow guiding component in a direction pointing directly towards the heat sink, while another portion of the airflow of the incoming air may be blown by the flow guiding component and deflected and guided by the upper wall portion so as to travel into the gas channel 5. As such, a two-way flow splitting functionality of the fan 4 which functions as the flow guiding component is implemented.

And in an alternative embodiment of the disclosure, as illustrated in FIG. 18(*b*) and FIG. 19, FIG. 18(*b*) illustrates a schematic front perspective view of the lighting and/or signaling device and the gas guiding device used for it, as illustrated in FIG. 16, and by way of example, the gas guiding device may alternatively extract gas, by the fan 4 located downstream, from air within the inner chamber, especially the back portion of the inner chamber defined by the back chamber shell 500 as illustrated in FIG. 20, via an airflow suction portion (i.e., referred to as 'second channel inlet', as indicated by reference numeral 52' as illustrated) located at an upper left corner thereof. And for example, the airflow, which is extracted from the inner chamber by the extraction of the fan 4 located downstream and then through the airflow suction portion of the gas channel, may travel over the surface of the lens above all and then be guided from the second channel inlet 52' so as to flow actively towards the fan 4. As such, by accelerating the airflow at the surface of the outer lens so as to carry out air molecules having relatively high humidity at the surface of the outer lens and to accelerate elimination of the phenomenon of condensation, and the temperature difference may be inhibited by bringing away the heat accumulated locally inside of the outer lens with the airflow which enters subsequently and continuously so as to/restrain there, then the phenomenon of condensation may be prevented in advance, or be eliminated swiftly if it is presented.

Specifically, as illustrated in FIG. 18(*b*), with the suction/extraction of the fan 4 located downstream, when the airflow which is in the back portion of the inner chamber defined by the back chamber shell 500 as illustrated in FIG. 20, is extracted into the gas channel at a distal end thereof (e.g., referred to as 'second channel inlet', as indicated at reference numeral 52' as illustrated), and the delivered forcibly towards the fan 4 which may be considered to be arranged downstream thereof, all of the airflow thus introduced may be exhausted via a channel outlet (which is referred to as 'second channel outlet' 51') provided adjacent to the fan 4, and deflected against and guided by a wall portion (referred to as "lower wall portion") enclosed at a lower side of the fan 4, outside the gas channel, so as to enter the gas channel 5, i.e., the wall portion 51 functions as an initiating point of a flow path of the airflow towards the heat sink. And then the airflow continues to be pushed towards the heat sink by subsequent airflow. The gas channel 5 is arranged circuitously depending on profiles of internal components and parts inside the lighting and/or signaling device 400 and spaces among them, to form a plurality of corners therein at relatively small angles inclined among walls of the gas channel and to point generally towards the surface of the outer lens, which function as the region of interest having high risk of producing the condensation. Therefore, such a configuration may avoid excessively large loss in momentum of air. Preferably, except for reduced cross sections provided at downstream sides adjacent to several corners, cross sections of the gas channel 5 at other locations have substantially same dimension and shape, so as to take advantage of the Bernoulli principle to accelerate airflow to ensure that flow rate of the airflow of air subsequently arriving at the surface of the outer lens is substantially consistent.

In addition, for example, an enclosed housing may be provided around the fan, especially below the fan, such that the air flow exhausted out of the second channel outlet 51' is reflected by the enclosed housing towards the fan 4, and in turn blown towards the heat sink 41 located downstream and at the light source 4001, so as to play a principal role in heat dissipation for the lighting and/or signaling device 400 and then exhausted e.g., from the heat sink as illustrated in FIG. 17.

And based on above embodiment of the disclosure, it may be taken into consideration that, the ventilation may tend to bring in external moisture into the vehicle lamp, which may readily facilitate occurrence of condensation therein. Therefore, at an entrance of the fan (which functions as the flow guiding component) or the gas channel 5, for the airflow, a heater may be provided additionally so as to remove excessive moisture; or alternatively, an opening provided with a labyrinth seal may be provided there for ventilation; or otherwise, another opening provided with a filtering membrane or capillaries may be provided for ventilation.

Specifically, in an exemplary embodiment of the present disclosure, the embodiments as illustrated in FIG. 18(*a*) differ from that as illustrated in FIG. 18(*b*) in that, in FIG. 18(*a*), the lower side below the fan which functions as the flow guiding component is opened, so as to extract gas from external environment into the inner chamber due to the pressure difference created by extraction of the fan, and in such a condition, the extraction/suction effect of the fan cooperates with a deflection effect of the airflow applied by the upper wall portion of the gas channel 5 which is arranged alongside the air inlet side of the fan, so as to implement a two-way flow splitting functionality which blows simultaneously the airflow towards the heat sink and towards the gas channel 5 respectively, to comparison, as illustrated in FIG. 18(*b*), the lower side below the fan is an enclosed wall portion of the housing, such that the air in the back portion of the inner chamber defined by the back chamber shell 500 as illustrated in FIG. 20 may essentially be extracted via the gas channel 5, due to the pressure difference caused by the extraction effect of the fan (And the airflow may travel over the surface of the outer lens, i.e., contrary to the condition as illustrated in FIG. 18(*a*), both intending to function to prevent occurrence of condensation thereon). In such a condition, the direction of the airflow in the gas channel is essential opposite to that as illustrated in FIG. 18(*a*), thus there is no two-way flow splitting in the embodiment as illustrated to FIG. 18(*b*). Therefore, the embodiment of FIG. 18(*b*) functions as an alternative to that of FIG. 18(*a*).

In above embodiments of the disclosure, the flow guiding component such as the fan 4 and the like may be adopted to drive the airflow initially, and also by the circuitous arrangement of the gas channel 5, and corners therein as well as the decreased cross sections at a downstream side immediately adjacent to the corners, a forced flow of the airflow may be further guided so as to accelerate the airflow over the surface of the outer lens where it passes, and to diminish or even eliminate the temperature differences among various subdivided regions thereof. As such, the condensation within the vehicle lamp may be controlled so as to be prevented or eliminated swiftly, without any dependency on any anti-fog coating, and in turn without any restriction of aging/degradation of the coating. Furthermore, since an air circulation device may be used for driving the airflow in motion forcibly, an overheating problem in the vehicle lamp (e.g., of the outer lens thereof) may be avoided, so as to decrease requirements on heat resistance property of the components of the vehicle lamp.

By way of example, the flow guiding component may for example be a fan 4 mounted on the lamp shell, or another device, such as a vacuum suction device, an air pump and the like. In practice, the flow guiding component may be to a form of a single fan, or alternatively a combination of two or more fans. The combination of a plurality of fan may implement a more complicated flow path of the airflow. In an example, the (low guiding component comprises two or more fans mounted on the lamp shell, which face towards different directions (for example, the two or more fans facing towards the heat sink 41 and the gas channel 5 respectively as illustrated in FIG. 18(*a*)), or located at other positions within the lighting and/or signaling device such that the air may flow in a predetermined flow path which twist and/or turns, in this way, the flow path of the airflow may extend and him along a plurality of directions, such that exchange among various components within the lamp shell may be implemented more sufficiently.

In an embodiment, in addition to the flow guiding component and the gas channel 5, a temperature and/or humidity sensor and a controller may further be provided. The temperature and/or humidity sensor are/is configured to measure a temperature and/or a humidity inside the lamp shell; and the controller is configured to control the gas guiding device to change local flow rate and direction of the air flow depending on results of measurement of the temperature and/or humidity sensor. With the temperature and/or humidity sensor and the controller, both the flow rate and direction of the airflow may be adjusted timely or even in real time, so as to improve efficiency of heat dissipation and increase the flow rate of the airflow flowing above the surface of the lens, facilitating save in energy.

In an embodiment, it may further provide an additional flow guiding device, such as an additional fan and the like, in the gas channel at either one or more corners of the gas channel, for forcing the air to flow, such that the flow path of the airflow may turn and change along the profile of the inner wall of the gas channel, for a more smooth guidance of the airflow.

For example, the flow guiding component and the additional flow guiding component may be driven by a conventional power source such as electrical power, solar energy, and the like.

According to the embodiments of the present disclosure, the lighting and/or signaling device may be a vehicle lamp of a motor vehicle or a non-motor vehicle.

In another aspect of the embodiments of the present disclosure, the lighting and/or signaling device is also provided, comprising the light source, the lamp shell and the gas guiding device as set forth above.

At least one advantage may be provided by the technical solution of the embodiments of the disclosure, as below:

One advantage lies in that, by a gas guiding device which may be easily manufactured depending on the internal profiles and arrangement of components and part thereof, heat dissipation in the lighting and/or signaling device, especially at the light source thereof, may be facilitated.

Another advantage lies in that, meanwhile, the airflow may be accelerated, e.g., over the surface of the outer lens which is readily condensable, to avoid condensation.

Although some embodiments of the disclosure have been described in view of the attached drawings, the embodiments disclosed in the drawings are only intended to illustrate the preferable embodiment of the present disclosure exemplarily, and should not be understood to limit the present application.

Although several exemplary embodiments of the general concept of the present disclosure have been shown and described, it would be appreciated by those skilled in the art that various changes or modifications may be made in these embodiments without departing from the principles and spirit of the disclosure. The scope of the present application is defined in the appended claims and their equivalents.

What is claimed is:

1. A gas guiding device for a lighting and/or signaling device, comprising:
   a gas channel, which extends in the gas guiding device and has two ends, one of the two ends being opened to one or more readily condensable locations of the lighting and/or signaling device; and
   a flow guiding component, which is disposed between the other end of the two ends of the gas channel and a heat sink of the lighting and/or signaling device, and is provided with an air inlet side located immediately adjacent to and in fluid communication with the other end of the gas channel and an air outlet side located upstream of the heat sink and facing towards the heat sink,
   wherein the flow guiding component is configured to extract an air flow at the air inlet side and to blow the air flow towards the air outlet side; and
   wherein the gas channel is arranged to guide at least a portion of the air flow by the extraction of the flow guiding component to flow through the one or more readily condensable locations of the lighting and/or signaling device.

2. The gas guiding device according to claim 1, wherein the air inlet side of the flow guiding component is constructed to open to an ambient environment such that the air inter side is configured to extract the air flow from the ambient environment.

3. The gas guiding device according to claim 1, wherein the air inlet side of the flow guiding component is configured to be sealed off from an ambient environment such that the air inlet side is configured to extract the air flow from the other end of the gas channel located immediately adjacent to the air inlet side.

4. The gas guiding device according to claim 1, wherein the gas channel is arranged circuitously depending on profiles of internal components inside the lighting and/or signaling device and spaces inside the lighting and/or signaling device, to form a plurality of corners therein and to point essentially towards the readily condensable locations.

5. The gas guiding device according to claim 1, wherein the readily condensable locations comprise a surface or surfaces of an external lens.

6. The gas guiding device according to claim 1, wherein the gas guiding device is provided at an inlet thereof with one of the following: a heater, an opening provided with a labyrinth seal for ventilation, and an opening provided with a filtering membrane or capillaries.

7. The gas guiding device according to claim 1, wherein an additional flow guiding component is provided, at a location of at least one corner inside the gas channel, to face downstream of the gas channel.

8. A lighting and/or signaling device, comprising a light source and the gas guiding device according to claim 1.

* * * * *